United States Patent

Kuwabara et al.

[11] Patent Number: 6,018,569
[45] Date of Patent: Jan. 25, 2000

[54] INFORMATION TRANSMISSION/RECEPTION DEVICE

[75] Inventors: Kazuhiro Kuwabara, Handa; Tetsuya Ouchi, Tajimi; Tokunori Kato, Ichinomiya, all of Japan

[73] Assignee: Brother Kogyo Kabushiki Kaisha, Nagoya, Japan

[21] Appl. No.: 08/917,389

[22] Filed: Aug. 26, 1997

Related U.S. Application Data

[62] Division of application No. 08/428,677, Apr. 25, 1995, Pat. No. 5,734,701.

[30] Foreign Application Priority Data

| Apr. 26, 1994 | [JP] | Japan | 6-112296 |
| Apr. 26, 1994 | [JP] | Japan | 6-112297 |
| Apr. 28, 1994 | [JP] | Japan | 6-113963 |

[51] Int. Cl.[7] .................................................. H04M 11/00
[52] U.S. Cl. .............................. 379/100.01; 379/102.01; 379/100.06
[58] Field of Search ........................ 379/100.01, 100.09, 379/102.01, 102.02, 88.13, 88.08, 100.06

[56] References Cited

U.S. PATENT DOCUMENTS

| 4,481,382 | 11/1984 | Villa-Real . |
| 4,602,129 | 7/1986 | Matthews et al. . |
| 4,998,272 | 3/1991 | Hawkins, Jr. et al. . |
| 5,258,751 | 11/1993 | DeLuca et al. . |
| 5,493,611 | 2/1996 | Hubert . |
| 5,544,234 | 8/1996 | Terajima et al. ............ 379/88.08 |
| 5,696,812 | 12/1997 | Ono ........................... 379/88.13 |
| 5,761,283 | 6/1998 | Chung ........................ 379/88.13 |

FOREIGN PATENT DOCUMENTS

| 63-11800 | 1/1988 | Japan . |
| 1-67599 | 5/1989 | Japan . |

*Primary Examiner*—Curtis A. Kuntz
*Assistant Examiner*—Melur Ramakrishnaiah
*Attorney, Agent, or Firm*—Oliff & Berridge, PLC

[57] ABSTRACT

While the answering machine is recording a message from a remote caller, if it is determined that an automatic reproduction request code has been inputted over the telephone, the time and day designated by the remote caller on which the message is to be reproduced is inputted as reproduction time data. Afterward, the message spoken by the remote caller is recorded as sound data. Also the time and day designated for reproduction is stored as automatic reproduction time data. When, by passage of time, the time registered by the clock circuit matches the time and day designated for reproduction, an alarm is sounded by the speaker 14. Then the message is reproduced.

6 Claims, 18 Drawing Sheets

FIG. 18

RAM MANAGEMENT DATA

| DATA TYPE | CLUSTER NO. | ATTRIBUTE INFORMATION OF EACH DATA | | |
|---|---|---|---|---|
| FAX TRANSMISSION | 1～11 | RESOLUTION : FINE | ENCODING TYPE : MH | |
| SCHEDULE | 12～21 | REPRODUCTION DATE : 1994.4.29 8:00 | ERASURE DATE : — | MESSAGE-REPRODUCED FLAG F : OFF |
| FAX RECEPTION | 22～30 | RESOLUTION : S. FINE | ENCODING TYPE : MR | |
| SCHEDULE | 31～38 | REPRODUCTION DATE : 1994.1.19 7:30 | ERASURE DATE : — | MESSAGE-REPRODUCED FLAG F : OFF |
| SCHEDULE | 39～54 | REPRODUCTION DATE : 1994.1.18 19:00 | ERASURE DATE : 1994.1.19 19:00 | MESSAGE-REPRODUCED FLAG F : ON |
| FAX RECEPTION | 55～81 | RESOLUTION : STANDARD | ENCODING TYPE : MH | |

INFORMATION TRANSMISSION/RECEPTION DEVICE

This is a Division of application Ser. No. 08/428,677 filed Apr. 25, 1995 now U.S. Pat. No. 5,734,701.

BACKGROUND OF THE INVENTION

1. Field of the Invention

The present invention relates to an information transmission/reception device for transmitting information to a remote information transmission/reception device and for receiving information from a remote information transmission reception device. More particularly, the present invention relates to an information transmission/reception device capable of recording sound information inputted thereto.

2. Description of the Related Art

Various information transmission/reception devices are available, such as facsimile machines, telephones, computers, and other various communication devices. A conventional telephone with an answering machine function operates to allow a caller calling from a remote telephone to record a message even when no one is present to answer the telephone. After a message is recorded on the answering machine, an LED of the telephone flashes, or a message is displayed on a display of the telephone, to inform the user that a message stands recorded on the answering machine. This is also true when a user records a message directly on his or her own answering machine, that is, without telephoning, but by operating the answering machine.

However, there has been known a problem with conventional answering machines in that unless a user approaches fairly close to the answering machine, he or she will not notice the flashing LED or displayed message and therefore will not realize that a message stands recorded on the answering machine. This can lead to delay in hearing or even totally missing important messages.

SUMMARY OF THE INVENTION

To overcome this problem, it is preferable to automatically reproduce the message at a predetermined time after recorded.

It is therefore an objective of the present invention to provide an information transmission/reception device that receives input of a message and time at which the message is desired to be reproduced and that automatically reproduces the message at the desired time.

In order to attain the above object and other objects, the present invention provides an information transmission/reception device for transmitting information to a remote information transmission/reception device and for receiving information from a remote information transmission/reception device, the information transmission/reception device comprising: inputting means for inputting information; receiving means for receiving information from a remote information transmission/reception device; sound reproducing means for reproducing sound information; information memory means for storing sound information when at least one of the information inputted by the inputting means and the information received by the receiving means includes sound information desired to be reproduced by the sound reproduction means, the information further including time information representing time when the reproduction-desired sound information is desired to be reproduced; clock means for measuring time; and reproduction control means for, when the time measured by the clock means reaches time represented by the time information, controlling the sound reproducing means to reproduce the reproduction-desired sound information stored in the information memory means.

According to another aspect, the present invention provides a telephone For automatically recording a spoken message transmitted over a telephone circuit, the telephone comprising: reception processing means for performing reception processes based on a reception signal transmitted from a remote telephone; memory means for storing a spoken message transmitted from the remote telephone; determination means for determining whether or not automatic reproduction request data for requesting automatic reproduction of the spoken message has been transmitted from the remote telephone during the reception processes of the reception processing means; reproduction means for reproducing the spoken message stored in the memory means; clock means for measuring time; and control means for, when the determination means determines that automatic reproduction request data has been transmitted from the remote telephone during the reception processes, storing in the memory means the spoken message and an automatic message reproduction time when the spoken message is desired to be reproduced, and for, when, according to the clock means, the automatic reproduction time has been reached, causing the reproduction means to reproduce the spoken message stored in the memory means.

According to still another aspect, the present invention provides a facsimile machine for transmitting information to and receiving information from a remote facsimile machine, comprising: data input means for inputting various data including sound data; transmission/reception control means for transmitting at least one of image data and sound data as transmission data to a remote facsimile machine and for receiving at least one of sound data and image data from the remote facsimile machine; sound data recording means for recording at least one of sound data inputted by the sound data input means and sound data received by the transmission/reception control means; sound reproduction means for reproducing the sound data recorded by the sound data recording means; visualizing means for visualizing various data; clock means for monitoring time; memory means for storing time information on time at which the sound data is desired to be reproduced, the time information being transmitted from the remote facsimile machine when the sound data is transmitted from the remote facsimile machine and being inputted by the data input means when the sound data is inputted by the data input means; and control means for controlling the sound reproduction means to reproduce the sound data when the time measured by the clock means reaches the time at which the sound data is desired to be reproduced, and for controlling said visualizing means, after the sound data is reproduced, to visualize an information that the sound data is reproduced and is retained in said recording means.

BRIEF DESCRIPTION OF THE DRAWINGS

The above and other objects, features and advantages of the invention will become more apparent from reading the following description of the preferred embodiment taken in connection with the accompanying drawings in which:

FIG. 18 illustrates how a storage region of the RAM at cluster No. 0 stores RAM management data.

DETAILED DESCRIPTION OF THE PREFERRED EMBODIMENTS

Figure 1:
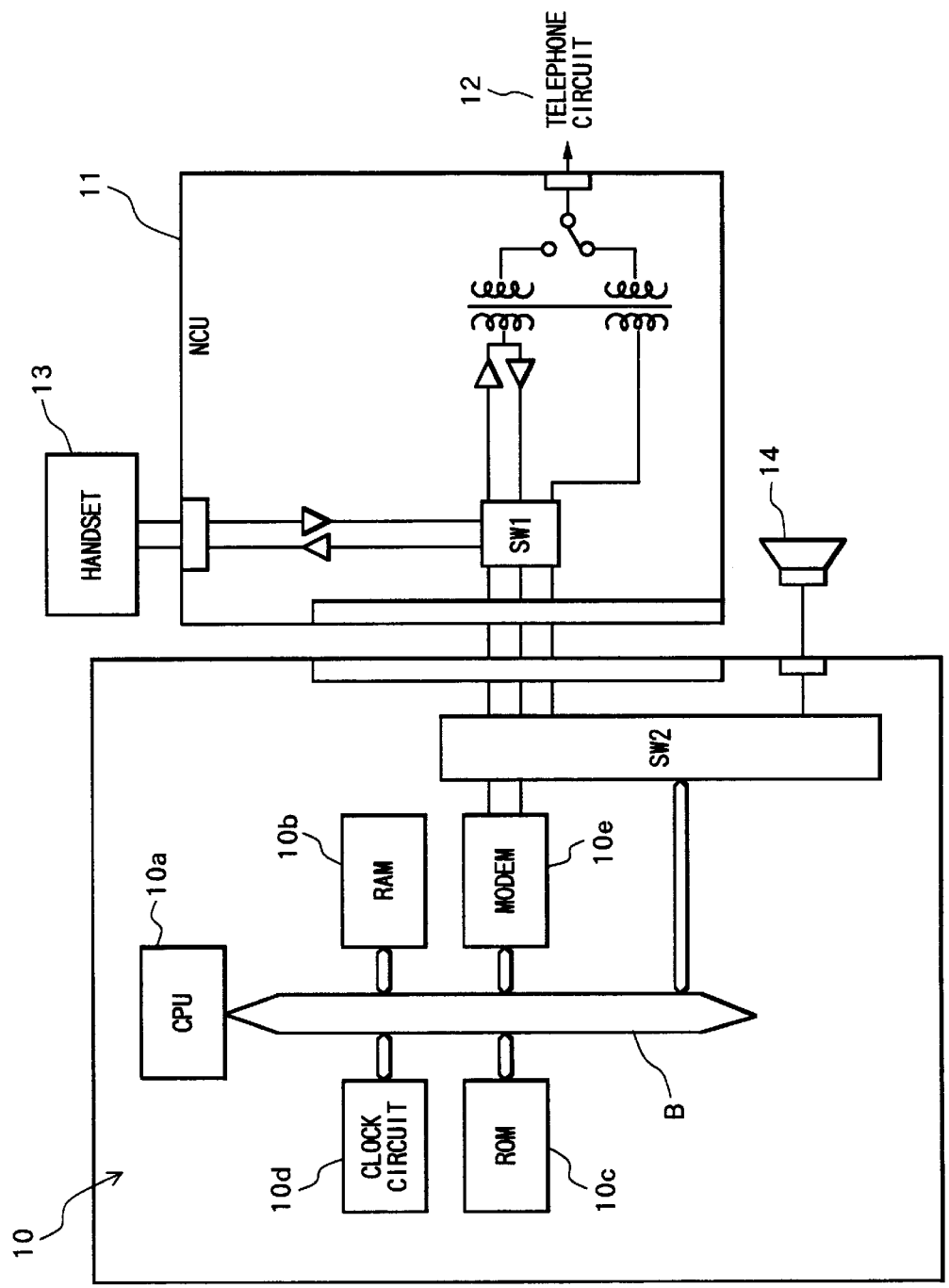
FIG. 1 is a block diagram of an answering machine according to a first embodiment of the present invention.

An information transmission/reception device according to preferred embodiments of the present invention will be described while referring to the accompanying drawings wherein like parts and components are designated by the same reference numerals to avoid duplicating description.

A first embodiment will be described below with reference to FIGS. 1 through 3. The first embodiment is directed to a telephone having an answering function (which will be referred to as an "answering machine" hereinafter).

FIG. 1 schematically shows the configuration of components in the answering machine of the present embodiment. The answering machine includes: a control portion 10; a network control unit (NCU) 11; a speaker 14; and a handset 13. The network control unit 11 is connected to a telephone circuit 12.

The control portion 10 mainly includes: a CPU 10a; a RAM 10b; a ROM 10c; a clock circuit 10d; a modem 10e; and a switch SW2. All components in the control portion 10 are connected to each other via a bus B. The CPU 10a is for executing a message record/reproduction routine represented by the flowcharts shown in FIGS. 2 and 3 and other various processes. The ROM 10c previously stores the program of the message record/reproduction routine. The switch SW2 is connected to the network control unit (NCU) 11 and the speaker 14.

The switch SW2 is for switching in response to a command from the CPU 10a so that the modem 10e can be selectively connected to the NCU 11 or to the speaker 14. A switch SW1 provided to the NCU 11 is for selectively connecting the telephone circuit 12 to either the modem 10e or the handset 13. When the switch SW1 is switched from the handset 13 to the modem 10e, sound data inputted from the telephone circuit 12 can be inputted to the modem 10e.

The modem 10e is for modulating analog sound data of messages inputted from the telephone circuit 12 into digital sound data for being stored in the RAM 10b. The modem 10e is also for demodulating the digital sound data retrieved from the RAM 10b into analog sound data for being reproduced at the sneaker 14.

The RAM 10b is for storing various data, such as data obtained in the record/reproduction routine. The RAM 10b includes files for storing the digital sound data of messages converted by the modem 10e and reproduction time data indicating the time, day, and date (referred to collectively as time hereinafter) designated for automatically reproducing the message.

The clock circuit 10d is used for managing timing at which the messages are reproduced. In order to properly fulfill this role, the clock circuit 10d is continuously driven by an independent power source to measure the passage of hours and days. The clock circuit 10d measures the time and outputs a time signal when the designated time arrives.

Although not shown in the drawing, the answering machine is further provided with a reproduction key connected to the CPU 10a. A user can manually operate the reproduction key for causing the answering machine to reproduce a message stored in the A 10b in a normal manner.

Figure 2:
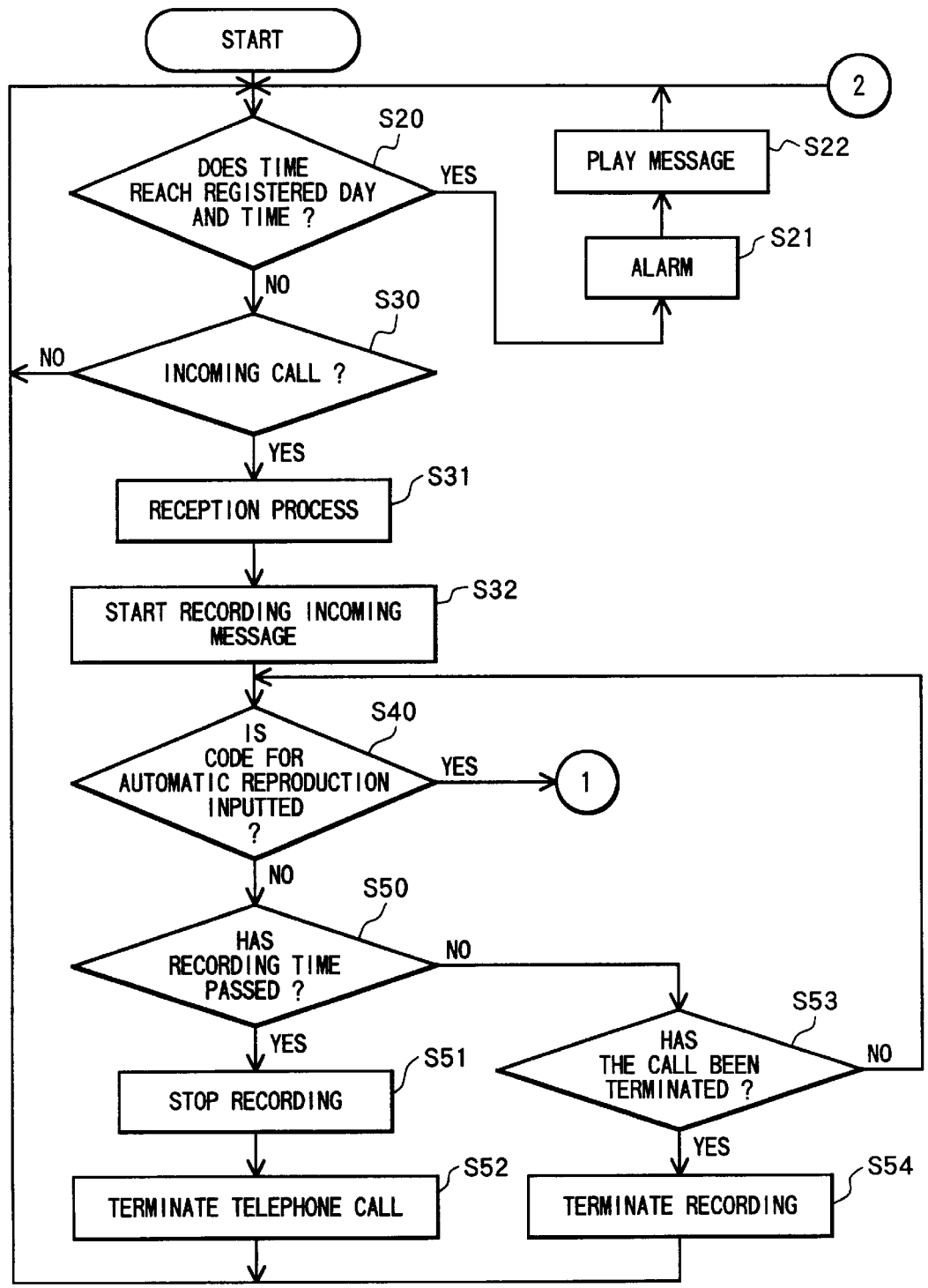
FIG. 2 is a part of a flowchart of a message record/repoduction routine of the first embodiment.
Figure 3:
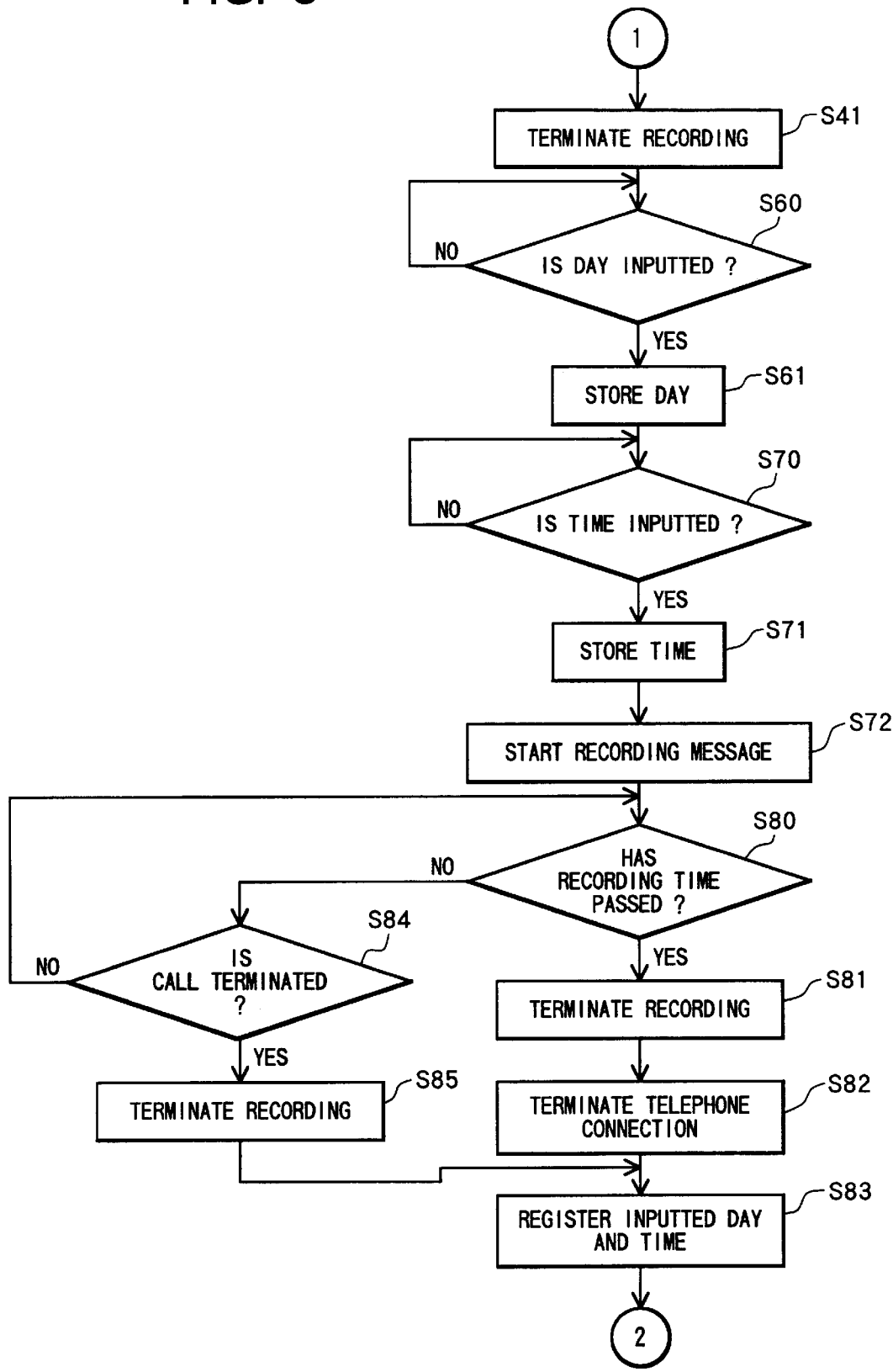
FIG. 3 is a remaining part of the flowchart of the message record/reproduction routine of the first embodiment.

When the answering machine is operating, the clock circuit 10d measures the time and the CPU 10a executes the message record/reproduction routine represented by the flowcharts shown in FIGS. 2 and 3. At first, no message, nor time for its reproduction, is stored in the RAM 10b (i.e., S20 is NO). Assuming that there are no incoming calls in this situation (i.e., S30 is NO), the routine will continue awaiting status. When an incoming call is received in the CPU 10a from a remote telephone via the NCU 11 and the switch SW2 (i.e., S30 is YES), in S31, the switch SW2 switches to the speaker 14. Also in S31, the CPU 10a outputs a reception sound signal to the speaker 14 and performs reception processes on the incoming call. In this way, a user is informed that a call has been received from a remote telephone. Next, in S32, the modem 10e converts the received analog sound data of messages into digital sound data, so that the RAM 10b stores or records the digital sound data.

When recording starts, whether or not the remote caller has inputted the code for requesting automatic reproduction of the message is determined in S40. The automatic reproduction request code, a social feature of the answering machine according to the present embodiment, is inputted by the remote caller to request automatic reproduction of the inputted messages at the time designated. If not (i.e., S40 is NO), recording is performed in the normal manner for the answering machine.

Next, whether or not a predetermined recording lime allowed for recording messages has passed or not is determined in S50. If not (i,e., S50 is NO), whether or not the remote caller has terminated the call during recording of the message is determined in S53. If not (i.e., S53 is NO), the program returns to S40. If so, (i.e., S53 is YES), recording is terminated in S54 and the program returns to the waiting status of S20 and S30. On the other hand, if the recording time runs out while the telephone circuit is still open (i.e., S50 is YES), recording is stopped in S51, the telephone call is terminated in S52, and the program returns to the waiting status of S20 and S30. Afterward, users can confirm the message using the normal method of answering machines. That is, the user depresses the reproduction key provided to the answering machine so that the message stored in the RAM 10b is reproduced at the speaker.

When an automatic reproduction request code is inputted from the remote telephone at the start of recording in S32 (i.e., S40 is YES), then recording is terminated in S41 (see FIG. 3). Next, whether or not the remote caller has inputted the day on which the message is to be automatically reproduced is determined in S60. Because the remote caller has designated the day by inputting, for example, a number and a "#" symbol, this determination is achieved based on detection by the modem 10e via the NCU 11 of these inputted data. If so (i.e., S60 is YES), the inputted data is stored in the RAM 10b in S61. It should be mentioned that each day of the week is prestored in the ROM 10c indicated by a number code from 1 to 7.

Next, whether or not the remote caller has inputted the time at which the message is to be automatically reproduced is determined in S70. Because the remote caller has designated the time by inputting numeral keys for four digit numbers and the "#" code, for example, this determination is achieved based on detection by the modem 10e via the NCU 11 of these inputted data. If so (i.e., S70 is YES), the inputted data is stored in the RAM 10b in S71. Then recording of the message from the remote caller is started in S72. This starts conversion of the message in the modem 10e and storage of the converted message in the RAM 10b as sound data. Whether or not the predetermined recording time allowed for recording messages has passed is determined in S80. If so (i.e., S80 is YES), recording operations are terminated in S81 and the telephone connection is terminated in S82. Next, in S83, the time stored in S71 and the day stored in S61 are registered in the time circuit 10d. The program then returns to the waiting status of S20 and S30.

When the remote caller terminates the call during recording of the message (i.e., S84 is YES), recording processes are terminated in S85 and the program proceeds to S83.

After the time and day are thus registered in S83, when the time as monitored by the clock circuit 10d reaches the registered time and day (i.e., S20 is YES), the clock circuit 10d produces a time signal. Receiving the time signal, the CPU 10a outputs alarm data to the speaker 14 via the switch SW2, in S21. The speaker 14 sounds an alarm as a result. The alarm data differs from the reception sound signal the CPU 10a produces by frequency division of the reception sound data in the reception process. The user can automatically confirm that a message has been recorded while he or she was absent. Next, in S22 the recorded message is outputted from the RAM 10b via the modem 10e, the switch SW2 to the speaker 14, which reproduces the message.

As described above, while the answering machine is recording a message from a remote caller, if it is determined that an automatic reproduction request code has been inputted over the telephone, the time and day designated by the remote caller on which the message is to he reproduced is inputted as reproduction time data. Afterward, the message spoken by the remote caller is recorded as sound data. Also the time and day designated for reproduction is stored as automatic reproduction time data. When, by passage of time, the time registered by the clock circuit 10d matches the time and day designated for reproduction, an alarm is sounded by the speaker 14. Then the message is reproduced. In this way, messages from remote callers are automatically reproduced at the designated time and day. Therefore, even if the user of the answering machine does not approach the answering machine he or she can know that a message has been recorded in the answering machine. Because an alarm is sounded before the message is reproduced, the user of the answering machine will not miss hearing the message.

Although the answering machine of the first preferred embodiment uses different sounds for the reception sound and the alarm sound, the same sound can be used for both the reception sound and the alarm sound. In this case, no circuit is additionally needed for producing alarm sound.

Also, the time designated for reproducing the message need not be inputted separately from the day. If the time and day are both inputted during the same step, the first digit inputted could represent the day and the next four digits the time.

In the above description, day and time is inputted as the designated time for reproducing the message. Alternatively, date and time can be inputted.

As described above, in the first embodiment, the caller can input an automatic reproduction request code and the time the message is to be automatically reproduced (automatic reproduction time) Afterward, the caller leaves a spoken message, which is stored along with the automatic reproduction time. The message recorded from the caller to the user of the answering machine is automatically converted into a reproduced voice at the designated time. Therefore, even if the user does not approach the answering machine, he or she will hear the message when it is reproduced.

The automatic reproduction request code data inputted by the caller can be in the form of a command data, based on which at the automatic reproduction time an alarm is sounded before the message is reproduced. Because the message is reproduced after an alarm is sounded, the user is sure to hear the reproduced message.

A second embodiment will be described below with reference to FIGS. 4 through 9.

According to the answering machine of the first embodiment, a user will not be able to hear the message if he or she is not present when the message is reproduced. In order to overcome this problem, the answering machine should preferably be added with a function to enable the user to visually confirm that the message was reproduced during he or she was not present.

It is conceivable to provide a facsimile machine with a similar function to the above-described answering function. With this function, a user can record a message (which will be referred to as a "schedule message" hereinafter) directly on his or her own facsimile machine with designating time at which the message is desired to be reproduced. (The function will be referred to as "schedule message function" hereinafter.) When the designated time arrives, an advisory chime or alarm is sounded and the schedule message is played back. Playback of the message can be stopped automatically after passage of a predetermined duration of time or manually by operation by a user. However, the user will not be able to hear the message if he or she is not present when the message is reproduced. A facsimile machine should therefore be designed to enable the user to visually confirm that the message was reproduced while he or she was not present.

The second embodiment is therefore directed to a facsimile machine which enables a user to visually confirm that the message was reproduced while he or she was not present.

Figure 4:
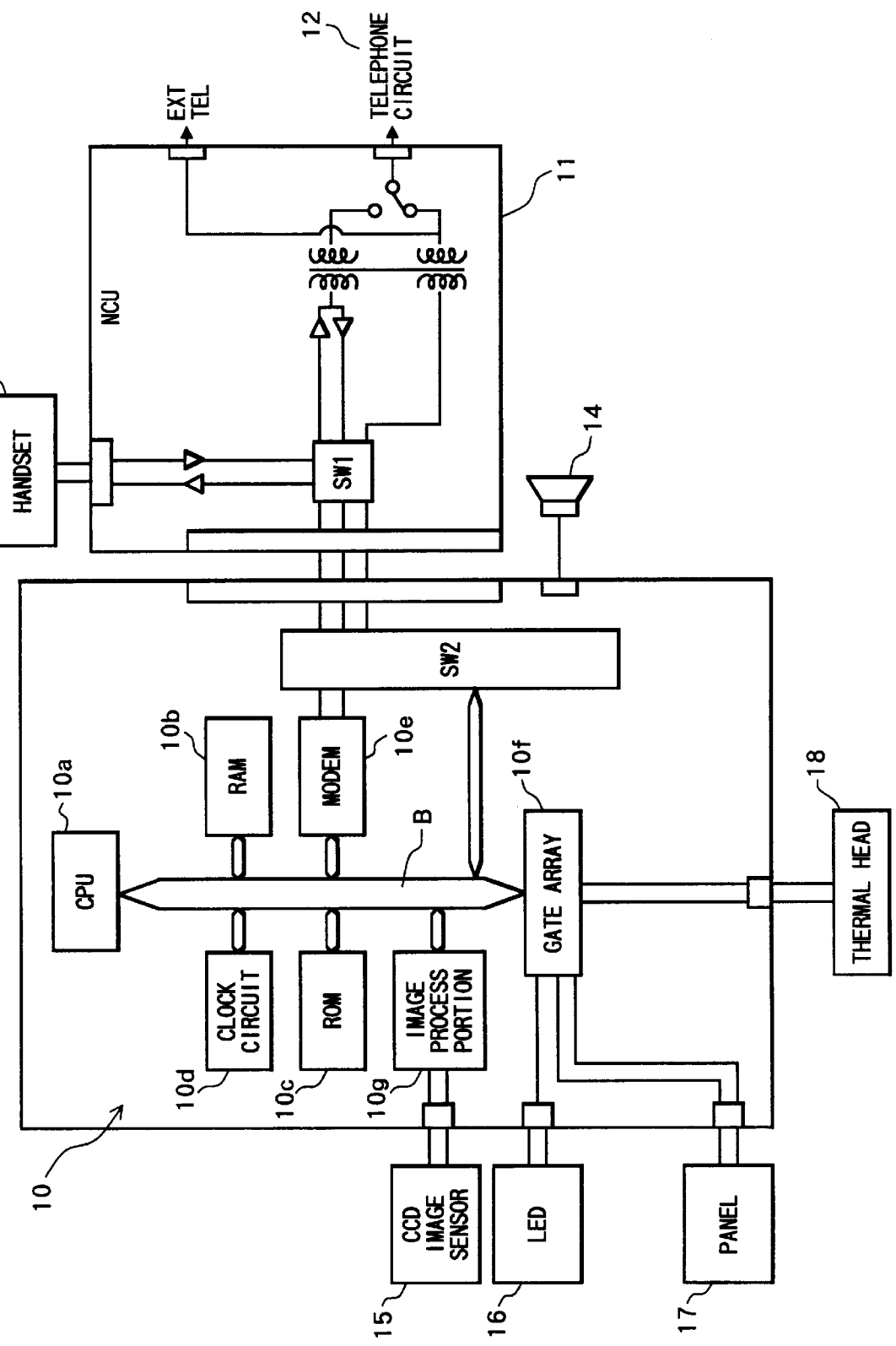
FIG. 4 is a block diagram of a facsimile machine according to second through fourth embodiments of the present invention.

The facsimile machine of the present embodiment has the configuration of components shown in FIG. 4. As can be seen by comparing FIGS. 1 and 4, the facsimile machine of the present embodiment has a similar configuration to that of the telephone of the first embodiment, with the exception of additional components discussed below.

In the control portion 10, an image process portion 10g is connected to a charge coupled device (CCD) image sensor 15 at its input terminal and to the CPU 10a via the bus B at its output terminal. The CCD image sensor 15 works in cooperation with a read light source (LED) 16 to read, as image data, a document to be transmitted. The gate array 10f is connected between a thermal head 18 for recording received image data and a panel 17 for performing display operations and key input operations. The gate array 10f is connected to the CPU 10a via the bus B.

Figure 5:
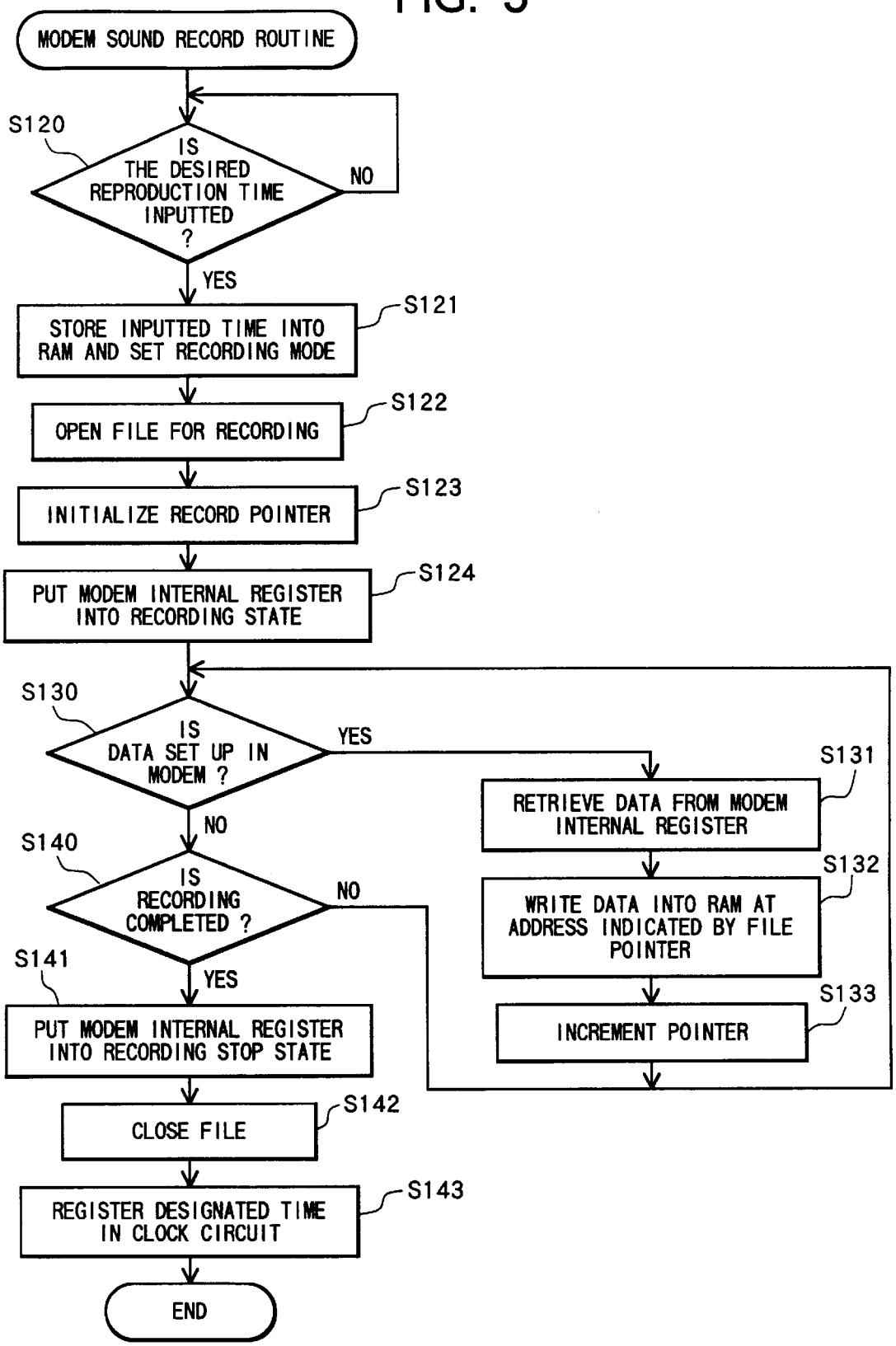
FIG. 5 is a flowchart of a sound recording routine of the second embodiment.
Figure 6:
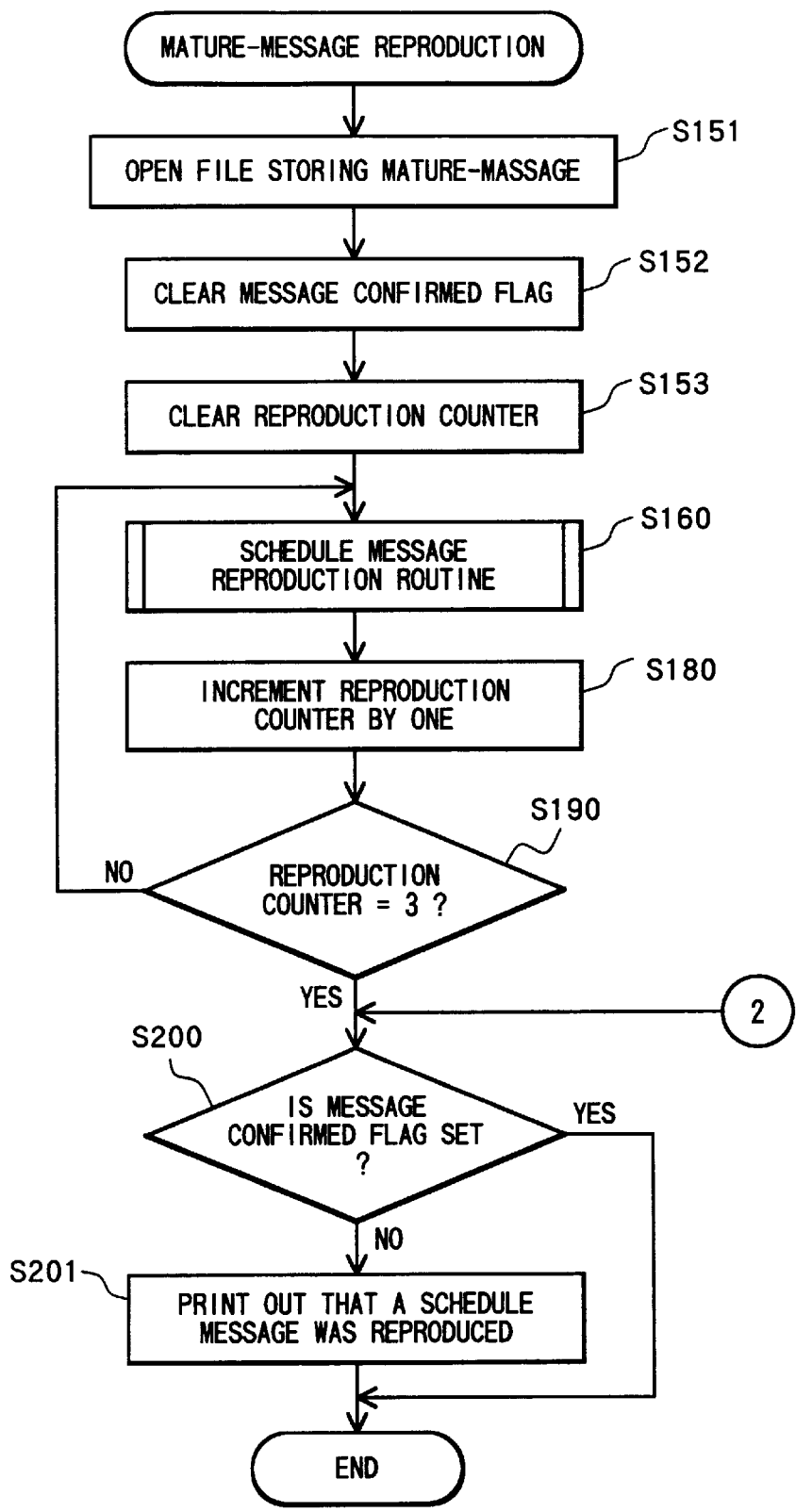
FIG. 6 is a flowchart of a mature-message reproduction routine of the second embodiment.
Figure 7:
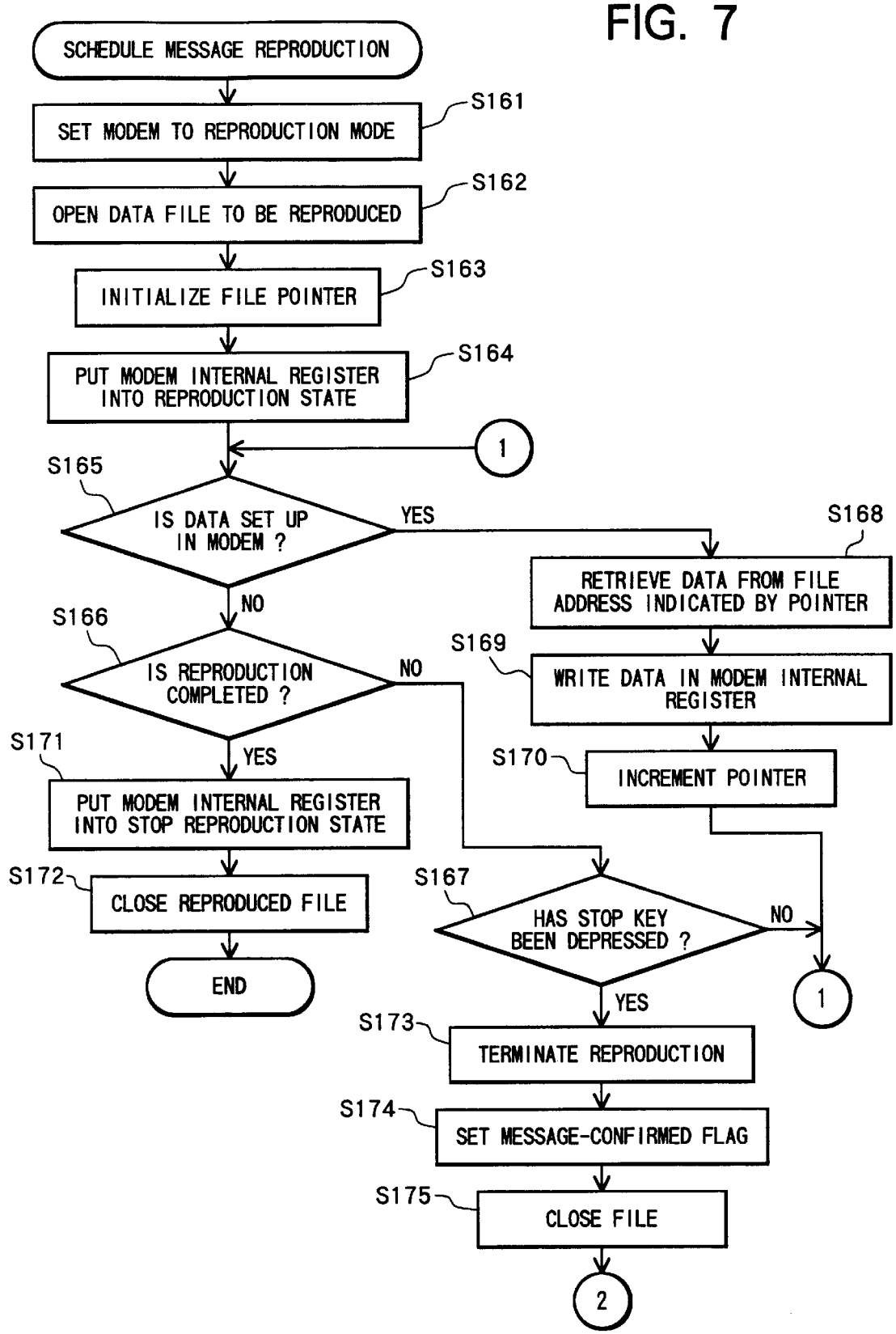
FIG. 7 is a schedule sound reproduction routine in the second embodiment.

The ROM 10c stores sound recording routine represented by the flowchart in FIG. 5 and mature-message reproduction routine represented by the flowcharts of FIGS. 6 and 7. The CPU 10a executes the sound recording routine to perform a message recording mode (which will be described later). The CPU 10a also executes the mature-message reproduction routine to perform a message reproduction print mode (which will be described later).

The RAM 10b stores message confirmed flag for indicating that a message has been reproduced and confirmed by a user. The RAM 10b also stores a reproduction counter for counting the number of times at which the message has been reproduced.

Although not shown in the drawing, the panel 17 includes a record key for starting sound record routine of FIG. 5 and a stop key for terminating reproduction of a message sound. The panel 17 further includes a reproduction key. An operator can manipulate the reproduction key to control the CPU 10a to reproduce a message sound, at any time, for example, after when the message has been reproduced at its designated time. These keys are connected to the CPU 10a for causing the CPU 10a to perform corresponding operations.

The modem 10e will be described below in greater detail. The modem 10e includes an internal register. The modem 10e is for converting analog sound data into compressed digital signal. The analog sound data is converted into a compressed one-byte digital signal while being stored into the internal register. When analog sound data is converted into one byte of compressed data in the internal register, the signal is set up so that the signal can be retrieved from the internal register to be stored in the RAM 10b. thus, the modem 10e produces compressed digital signal one-byte by one-byte from analog sound data, and transfers the digital signal to the RAM 10b. The modem 10e is also for reconverting the compressed digital signal into analog sound data. When the modem 10e has completed conversion processes for one byte of digital signal to produce analog sound data, the analog sound data is set up so that the data can be retrieved from the internal register and transferred to the speaker 14 via the switch SW2. Thus, the modem 10e produces analog sound data from every one byte of compressed digital signal, and transfers the analog sound data to the speaker.

Thus, the internal register of the modem 10e can be put into: sound recordation state for converting analog sound data into digital sound signal for being stored in the RAM 10b; and sound reproduction state for reconverting digital sound signal into analog sound data for being transmitted to the speaker 14. The state or mode of the internal register can be changed by rewriting a value in the internal register. The value of the internal register can be rewritten by accessing a predetermined addresses allotted for the internal register.

The modem 10e of this embodiment further serves to modulate image data for transmission to a remote facsimile machine and demodulate image data transmitted from the remote facsimile machine.

Reception and transmission of sound data and image data is executed according to normal processes by the components shown in FIG. 4.

First an explanation will be provided for the message record mode and the message reproduction print mode of the facsimile machine will be provided. The user puts the facsimile machine into the message record mode in order to record schedule messages to be reproduced at designated times. The facsimile machine enters the message reproduction print mode when the time designated for reproduction of the schedule message arrives. In the message reproduction print mode, the facsimile machine reproduces the schedule message and afterward prints out a message that a schedule message has been reproduced if the schedule message has not been confirmed by the user.

1. Message Record Mode

First, a user who wants to record a schedule message inputs a record command to the CPU 10a by manipulating a record key provided to the panel 17, whereupon the sound record routine shown in FIG. 5 is started. At the start of this routine, whether or not the user has inputted the desired reproduction time (date and time) of the schedule message by operating the numeric pad provided to the panel 17 is determined in S120. If so (i.e., S120 is YES), in S121, the inputted reproduction time is stored in the RAM 10b and the CPU 10a sets the modem 10e into the message recording mode. In S122 the file of the RAM 10b for storing recording data is opened. The record pointer of the file is initialized in S123. Then, the internal register of the modem 10e is put into a sound recording state in S124. The user speaks into the handset 13 to start recording of his or her schedule message. The schedule message is inputted as analog sound data into the modem 10e, via the NCU 11 and the switch SW2. The clock circuit 10d monitors the actual time.

The modem 10e converts the analog sound data into compressed digital data in its internal register. Every time when the modem 10e completes conversion for one byte of digital data, the digital data is set up into a condition that can be retrieved from the internal register.

Then whether or not data is set up in the modem 10e is determined in S130. During data is not set up (i.e., S130 is NO), the program proceeds to S140, where whether or not recording is completed or not is determined. During the schedule message is being recorded (i.e., S140 is NO), S130 and S140 are repeatedly executed until either S130 or S140 becomes a YES determination.

Each time a YES determination is made in S130, the data in the internal register of the modem 10e is retrieved in S131 and written into the RAM 10b in S132 at the address indicated by the pointer that has been initialized in S123. Then the pointer is incremented by one in S133.

Afterward, when recording is completed (i.e., S140 is YES), the internal register of the modem 10g is put into recording stop state so as to be prevented from recording in S141. The file in RAM 10b (that has been opened in S122) that now stores the recorded data is closed in S142. The designated time (that has been inputted in S121) is registered in the clock circuit 10d in S143. This brings the message recording routine to an end.

2. Reproduction Print Mode

Afterward, when the time and date measured by the clock circuit 10d reaches the designated time for a message to be reproduced, the mature-message reproduction routine represented by the flowchart in FIG. 6 is started. Ar the start of this routine, the file storing the corresponding sound data is opened in S151. The message confirmed flag of the sound data file is cleared to zero in S152 The reproduction counter is cleared in S153. Then the schedule message reproduction routine shown in FIG. 7 is started in S160.

At the start of the schedule sound reproduction routine, as shown in FIG. 7, the modem 10e is set to a reproduction mode in S161, whereupon the data file to be reproduced is opened in S162. The pointer for retrieving data from the file is initialized in S163. The internal register of the modem 10e is put into a sound reproduction state in S164. As a result of these steps, the modem 10e outputs the corresponding analog sound data to the speaker 14 via the switch SW2. The speaker 14 reproduces the sound data as a schedule message. Next, whether or not data is set up in the modem 10e is determined in S165. If not (i.e., S165 is NO), whether or not reproduction has been completed is determined in S166. If not (i.e., S166 is NO), whether or not the stop key has been depressed is determined in S167. if not (i.e., S167 is NO), the program returns to S165. If data is not yet set up in the modem 10e and reproduction is still continuing, S165 through S167 will all be NO determinations. Therefore, S165 through S167 are repeatedly executed until one is a YES determination.

Each time data is set up in the modem 10e (i.e., S165 is YES), data is retrieved from the address indicated by the pointer of the file in S168. Then the data is written in the internal register of the modem 10e in S169. The pointer is then incremented in S170. When data indicating completion of reproduction is detected (i.e., S166 is YES), the internal register of the modem 10e is put into a stop reproduction state in S171. Then the reproduced file is closed in S172, the sound reproduction routine is completed, and the program proceeds to S180 of the flowchart in FIG. 6.

In S580, the reproduction counter is incremented by one. Next, whether or not the value of the reproduction counter equals three is determined in S190. When the sound reproduction process of FIG. 7 has been conducted once, because the value of the reproduction counter is only one (i.e., S190 is NO), so the program returns to S160, whereupon sound reproduction processes are again executed. In this way, the schedule message is reproduced and outputted a second and a third time.

When the value of the reproduction counter reaches three (i.e., S190 is YES), whether or not the message confirmed flag is set to one is determined in S200. If the message confirmed flag has not yet been set to one after the initialization of S512 (i.e., S200 is NO), the program proceeds to S201 where a message Indicating that the schedule message has been reproduced at the designated time is printed out using the thermal head 18. Then the mature-message reproduction routine is completed.

On the other hand, as shown in FIG. 7, if a user hears the reproduced schedule message and so no longer needs to hear it, the user can depress the stop key on the panel 17, thereby transmitting a command for terminating reproduction of the schedule message to the CPU 10a. If the user depresses the stop key while S165 through S170 are being repeatedly executed (i.e., S167 is YES), reproduction of the schedule message at the speaker 14 is terminated in S173, the message confirmed flag is set to one in S174, the file with the sound data is closed in S175, and the program directly proceeds to S200. In this case, the message confirmed flag has been set to one in S174 (i.e., S200 is YES), the mature-message reproduction routine is brought to an end, without conducting the step S201.

As described above in the second embodiment, the time on which the schedule message is to be reproduced is stored in the RAM 10b, the schedule message is recorded, and the designated time is registered in the clock circuit 10d during execution of the routine represented by the flowchart shown in FIG. 5. When the designate time arrives, by repeating the sound reproduction routine represented by the flowchart of FIG. 7, the schedule message is reproduced in a reproduced voice three times. It can be determined that a user is not nearby, if the schedule message is reproduced completely three times without interrupted by the stop key. Unless it is determined that a user is nearby, a statement that the schedule message has been reproduced is automatically printed out. Because the user can confirm the content of the printed out statement, the user can quickly visually confirm that a message has been reproduced, without performing any operations. The user can then operate the reproduction key on the panel 17 to reproduce the message.

A user can stop the sound reproduction routine of FIG. 7, and therefore stop reproduction of the schedule message, by operating a stop key on the panel 17 as soon as he or she hears and understands the spoken schedule message. In this way, the statement of the schedule message will not be printed out unless necessary. When many schedule messages are recorded, substantially the same processes are performed for each schedule message at the corresponding designated time. Therefore the same effects can be obtained.

In the second embodiment, a value of three in the reproduction counter produces a YES determination in S190. However, the program can be designed so that any appropriate value such as one, two, four, or more triggers a YES determination in S190.

Also, instead of printing out the statement that indicates a schedule message has been reproduced as described for S201 in the second embodiment, the statement could be displayed on a liquid crystal display provided to the panel 17. The same results can be obtained as when the schedule messages are printed out.

Figure 8:
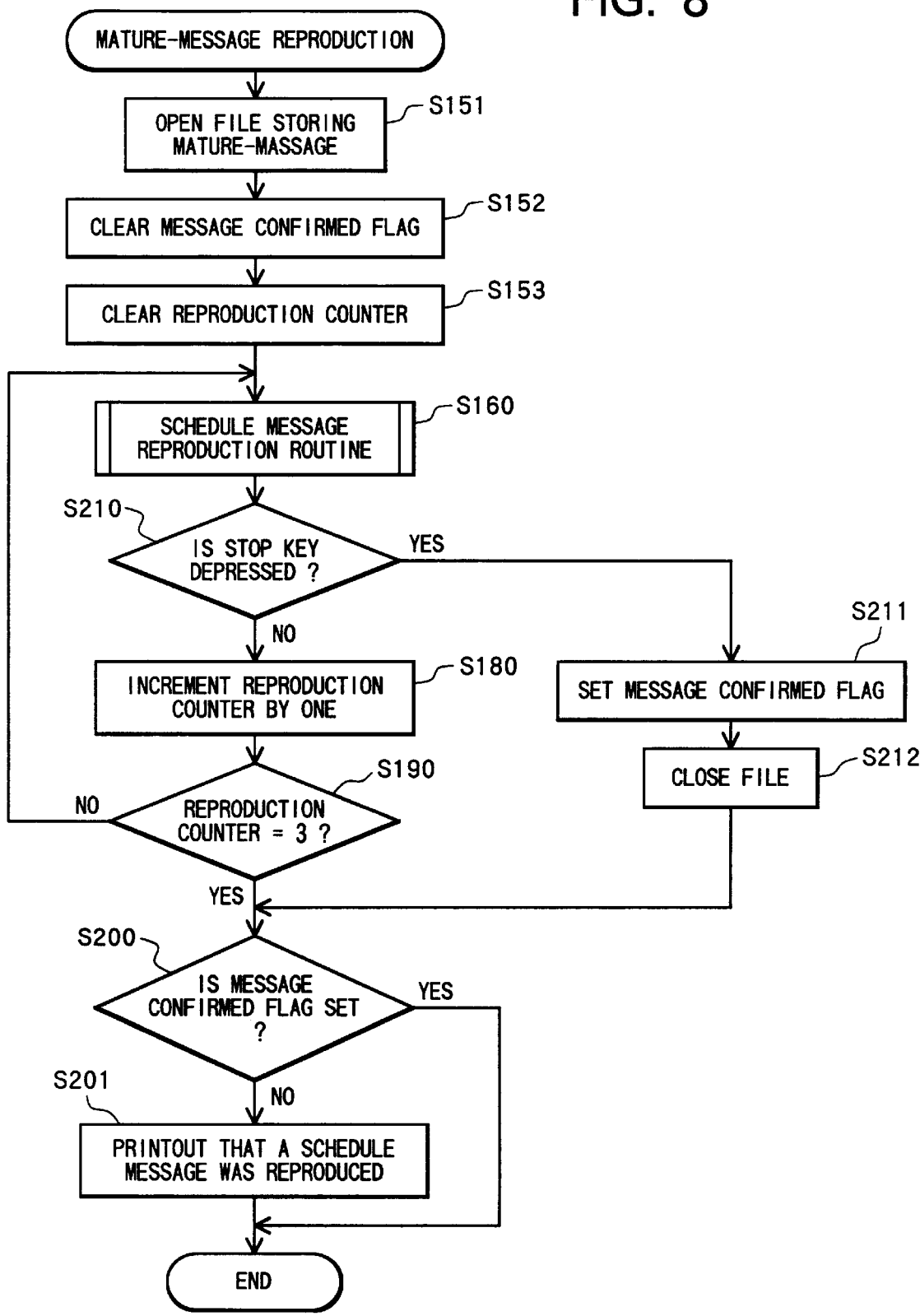
FIG. 8 is a flowchart of a routine according to a modification of the second embodiment.

FIG. 8 shows a flowchart representing a routine according to a modification of the second preferred embodiment. The routine of FIG. 8 is similar to the routine of FIG. 6, but between S160 and S180 includes an additional step S210, in which the same processes are performed as in S167 of FIG. 7. Also, when the user depresses the stop key, so that S210 is a YES determination, the program proceeds to S211 and S212, where the same processes are performed as in S174 and S175. Afterward the same processes are performed as for S200 and on of FIG. 6. That is, when the user depresses the stop key while the message (reproduction of a vocal message) is being reproduced (i.e., S210 is YES), after the entire portion of the schedule message is reproduced, the message confirmed flag is set to one in S211, the file for the sound data is closed in S212, and the mature-message reproduction routine is completed. When the stop key is depressed directly after reproduction is completed, the message confirmed flag is set to one, the file of the sound data is closed, and the present routine is completed in the same manner as described above.

Figure 9:
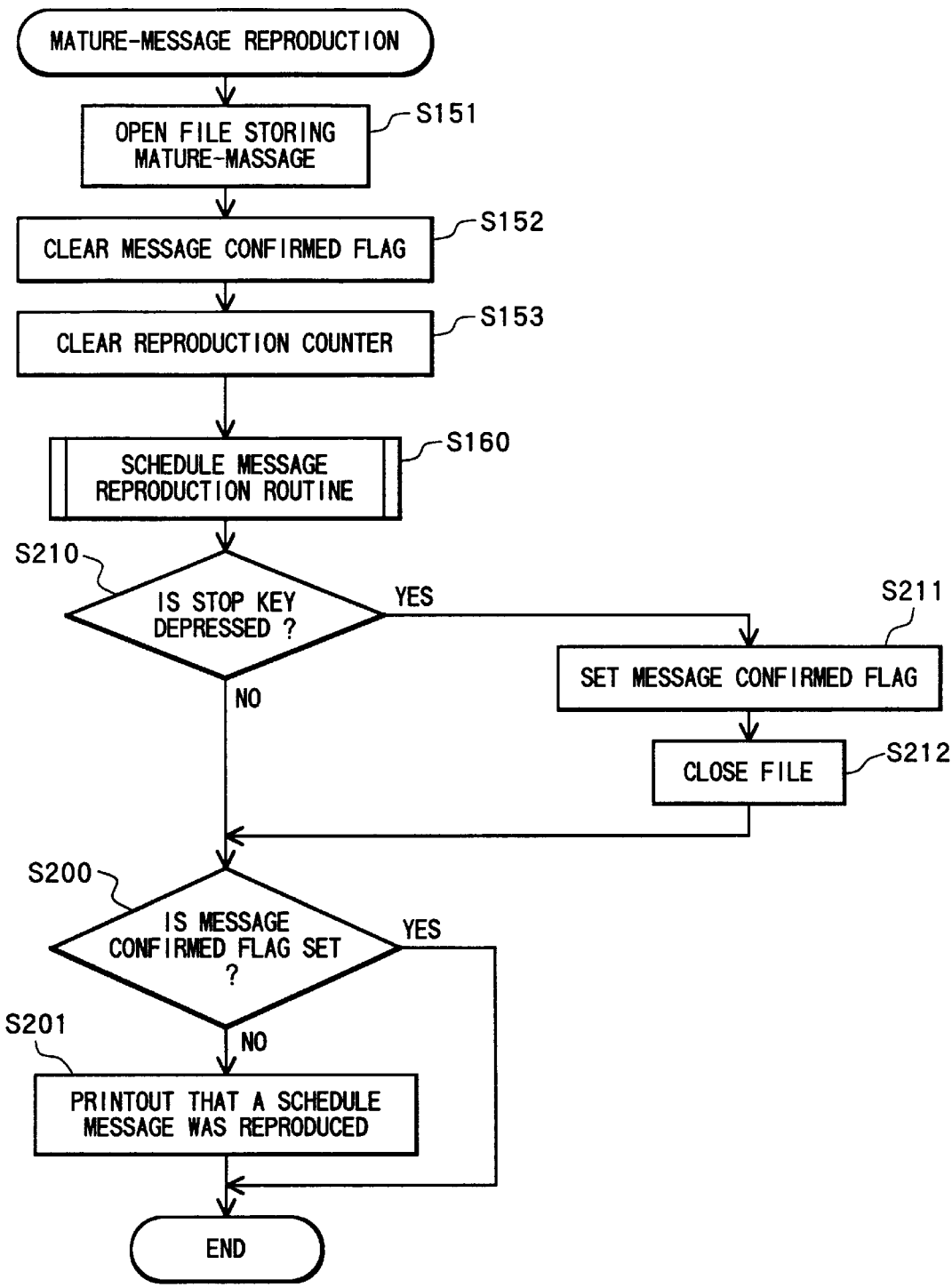
FIG. 9 is a flowchart of a routine according to another modification of the second embodiment.

A further modification to the second embodiment is represented by the flowchart shown in FIG. 9. The flowchart of this modification is the same as that of FIG. 8, except that S180 and S190 are omitted. A NO determination in S210 therefore results in the program proceeding to S200. With this design, the sound reproduction routine of FIG. 7 (S160) is performed only once. The processes in S211 and on are executed as described above.

As described above, according to the facsimile machine of the second embodiment, after a message is reproduced, but not acknowledged by a user, a statement is automatically printed out to indicate that the message has been reproduced but not acknowledged and that the message is being retained in a memory portion. Therefore, without performing any additional operations, a user can visually acknowledge that a message has been reproduced. The user can therefore actuate the facsimile machine to reproduce the message sound to certainly know the content of the message.

After a message is reproduced, but not acknowledged by a user, a statement may be automatically displayed to indicate that the message has been reproduced but not acknowledged and that the message is being retained in a memory portion. Therefore, without performing any additional operations, a user can visually acknowledge that a message has been reproduced. The user can therefore actuate the facsimile machine to reproduce the message sound to certainly know the content of the message.

Figure 10:
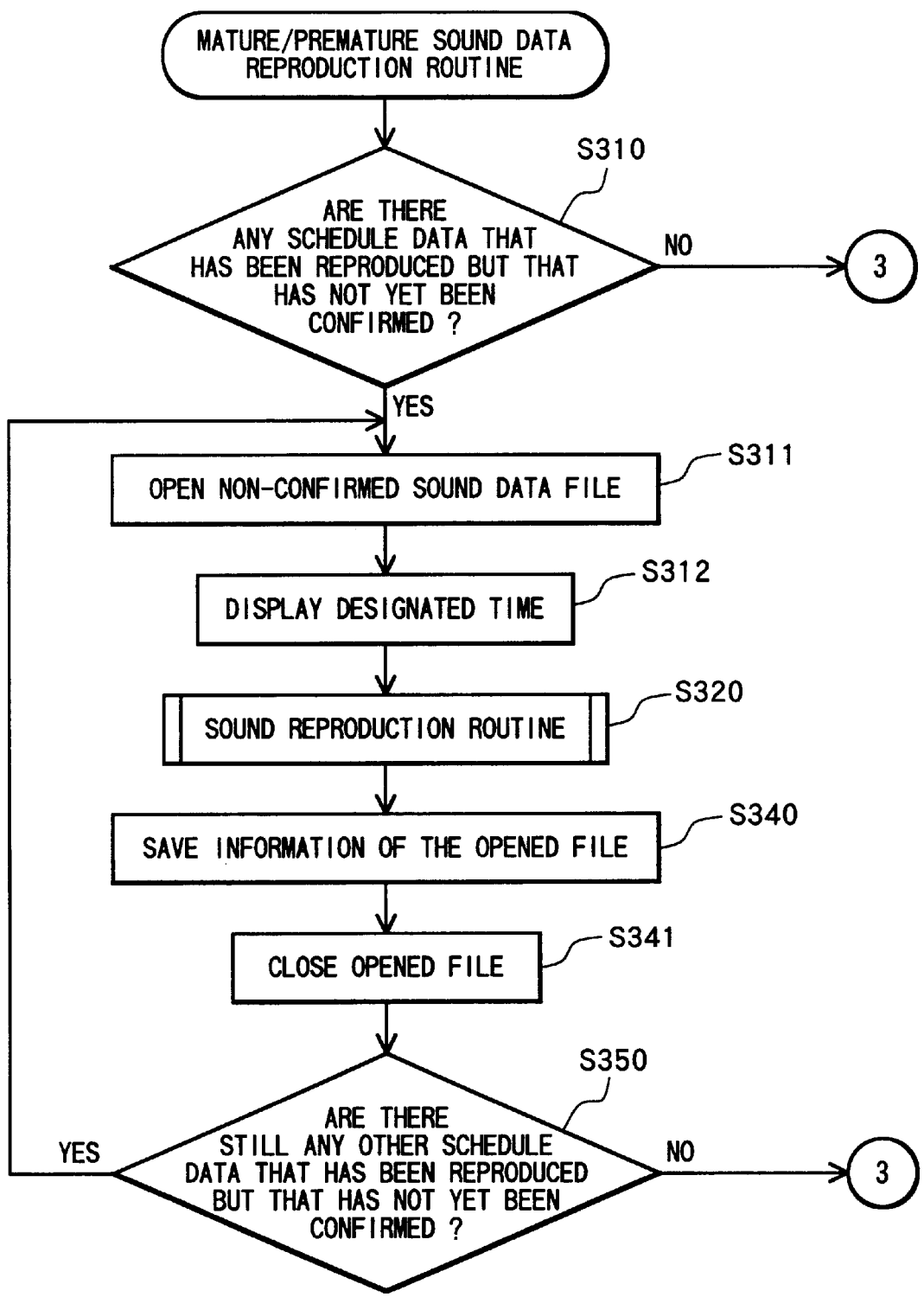
FIG. 10 is a part of a flowchart of a mature/premature message reproduction routine according to the third embodiment.
Figure 11:
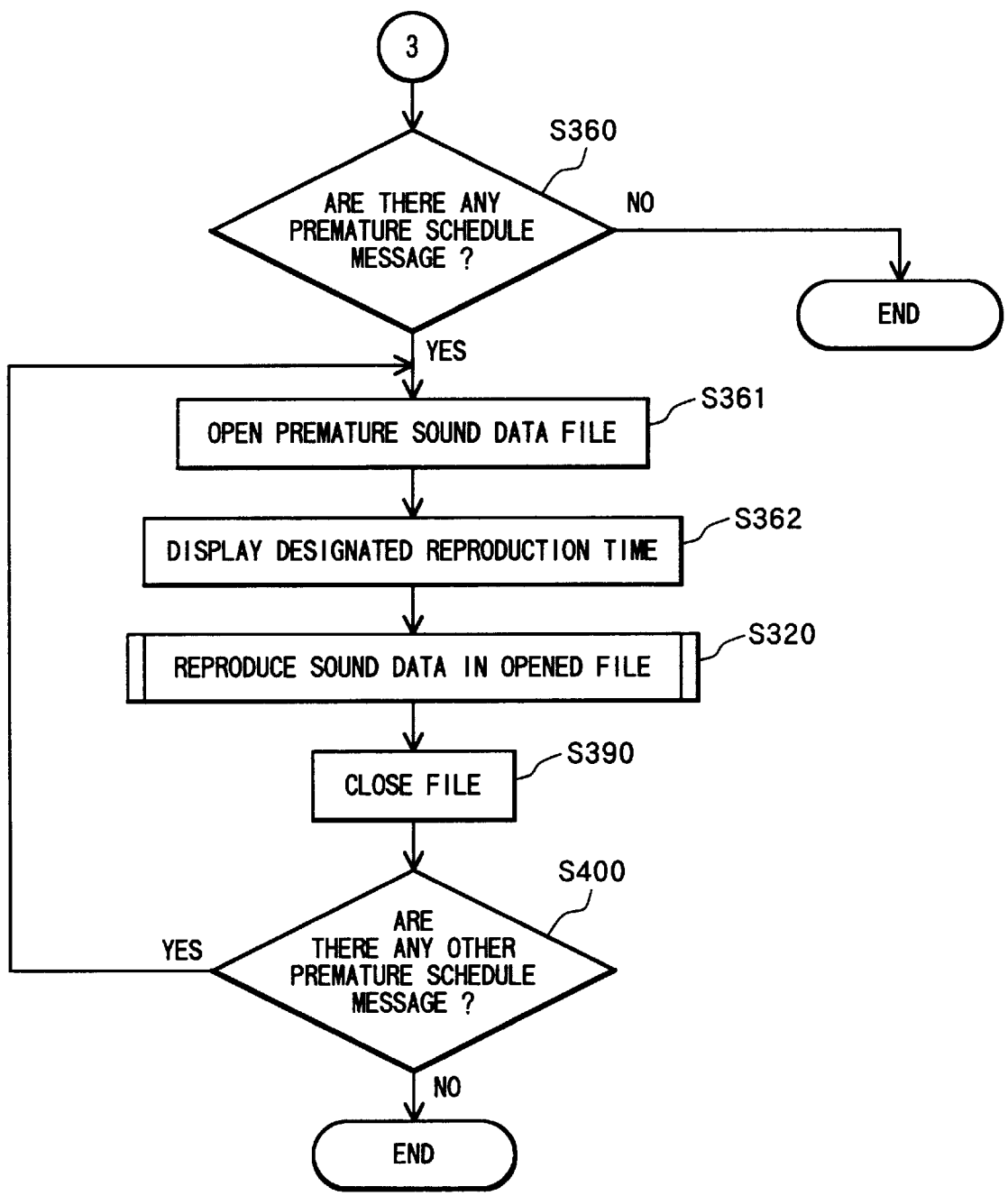
FIG. 11 is a remaining part of the flowchart of the mature/premature message reproduction routine of the third embodiment.
Figure 12:
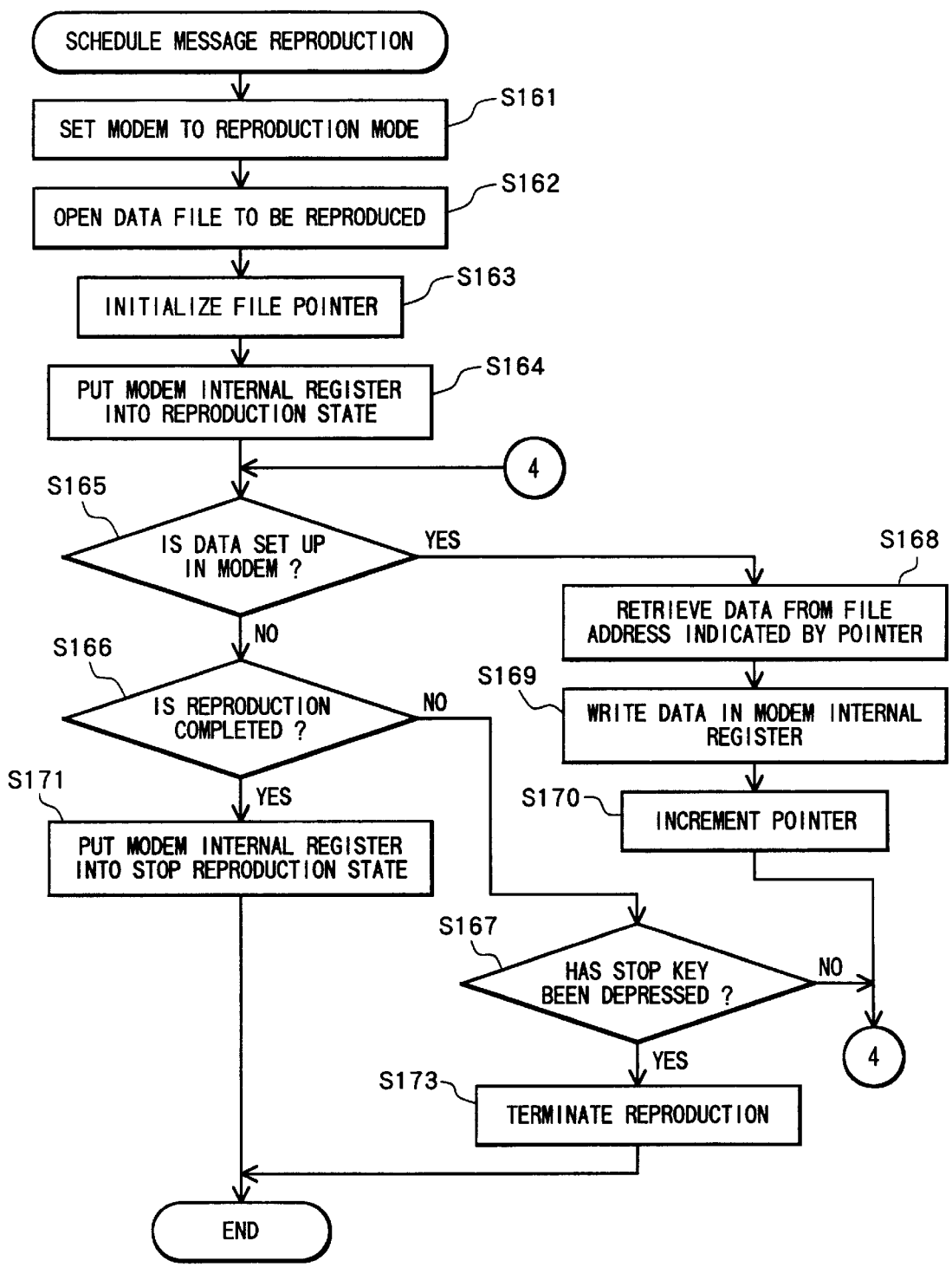
FIG. 12 is a flowchart of a sound reproduction process routine (schedule message reproduction routine) according to the third embodiment.

Next, an explanation of a facsimile machine according to a third embodiment of the present invention will be provided while referring to FIGS. 10 through 12. The facsimile machine according to the third embodiment is similar to that described in the second embodiment, except for the following points. The ROM 10c stores a mature/premature message reproduction routine represented by the flowcharts in FIGS. 10 through 12, in place of the mature-message reproduction routine represented by the flowcharts in FIGS. 6 and 7. The panel 17 further includes a function key and a play key for starting the mature/premature message reproduction routine. All other components of the facsimile machine of this embodiment are the same as in the second embodiment, so their explanations will be omitted here.

According to the third embodiment, the mature/premature message reproduction routine prestored in the ROM 10c is executed by simultaneously depressing the function key and the play key on the panel 17. In this example, it is assumed that a plurality of schedule messages designated to be reproduced at different times are recorded in the RAM 10b according to the processes represented in the flowchart of FIG. 5. These designated times for reproducing each schedule message are registered in order in the clock circuit 10d.

Assume that when the mature/premature message reproduction routine of FIG. 10 starts being executed, the RAM 10b stores at least one schedule message that has been reproduced at its designated time but that has not beer, confirmed by the user. The sound data for the schedule message that has already reached its designated time and therefore that has been reproduced but that has not been confirmed by the user will be referred to as "non-confirmed mature sound data" hereinafter. In this example, YES determination is achieved in S310, and the programn proceeds to S311. A file that stores the non-confirmed mature sound data with the earliest designated reproduction time is opened in S311. The time designated for reproducing the sound data is displayed on the panel 17 in S312 until sound reproduction processes of S320 are completed.

The program then proceeds to S320 where a sound process routine (schedule message reproduction routine) represented by the flowchart of FIG. 12 is performed. The sound process routine of FIG. 12 is almost the same as that shown in FIG. 7 except that a portion of the process from S172 on are different. That is, S172, S174, and S175 of FIG. 7 are eliminated, and the sound reproduction processes are completed after the execution of S173. In the sound process routine of FIG. 2, the sound data of the opened file is reproduced in S161 through S170 in substantially the same manner as in S161 through S170 of the second embodiment.

The information of the opened file is then saved in S340 and the file is closed in S341 either when reproduction is completed (i.e., S166 is YES), whereupon the internal register of the modem 10e is put into a stop reproduction state in S171, or when the user presses the stop key on the panel 17 during reproduction (i.e., S167 is YES), whereupon reproduction is terminated in S173. Then whether or not any other non-confirmed mature schedule message data still remains in the RAM 10b is determined in S350. If so (i,e., S350 is YES), S311 through S350 are repeated in substantially the same manner as described above, the time designated for reproduction of the corresponding sound data being continuously displayed through these processes.

On the other hand, when no non-confirmed mature sound data remains in the RAM 10b, i.e., when the determination in either S310 or S350 becomes NO, the program proceeds to 3360 of FIG. 11. in S360, whether or not the RAM 10b stores sound data for a schedule message designated to be reproduced at a future time (referred to as a "premature sound data" hereinafter) is determined. If so (i.e., S36C is YES), a file storing a premature sound data with the earliest designated reproduction time (i.e., premature sound data which is to be reproduced first) is opened in S361, and the designated reproduction time is displayed on the panel 17 in S362 while the message sound is being reproduced in S320.

Next, the program proceeds to S320 where the sound data of the file opened in S361 is reproduced according the flowchart of FIG. 12 in substantially the same manner as described in the second embodiment. A YES determination in S166 or S167 causes the program to proceed to S390 via S171 and S173 respectively. in S390, the opened filed is closed. As long as premature sound data that has not yet been reproduced in this routine remains in the RAM, the processes in S361 through S400 are repeated in substantially the same manner as described above. The time designated for reproducing sound data of each file that is opened in S361 is displayed in S362 all the while sound for the corresponding file is being reproduced. When no premature sound data remains in the RAM 10b, i.e., when either S360 or S400 is a NO defemination, these processes are completed.

As described above in the third preferred embodiment, by operating keys on the panel 17, the existence of mature but unacknowledged message sound data is serially displayed on the panel 17. Additionally, the existence of premature schedule sound data is also displayed on the panel 17. Therefore, when the tire designated for reproduction of a schedule message arrives, both the existence of a reproduced schedule message and premature schedule messages can be made known to the user.

Although the second and third embodiments describe the present invention applied for recording and reproduction of schedule messages, the present invention could be applied to recording and reproduction of any type of messages, for example, messages transmitted from a remote facsimile machine or a remote telephone.

While the second and third embodiments are directed to a facsimile machine, they may be applied to an answering machine.

A fourth embodiment will be described below with reference to FIGS. 13 through 18.

This embodiment is directed to a facsimile machine which automatically erases message after an appropriate duration of time passes after the message is automatically reproduced at its designated time. Between the designated reproduction time and the automatic erasure time, the facsimile machine displays a statement that message that has been already reproduced, is still stored in a memory portion.

The configuration of the facsimile machine of this fourth embodiment is the same as that of the second embodiment except for the following points.

Figure 17:
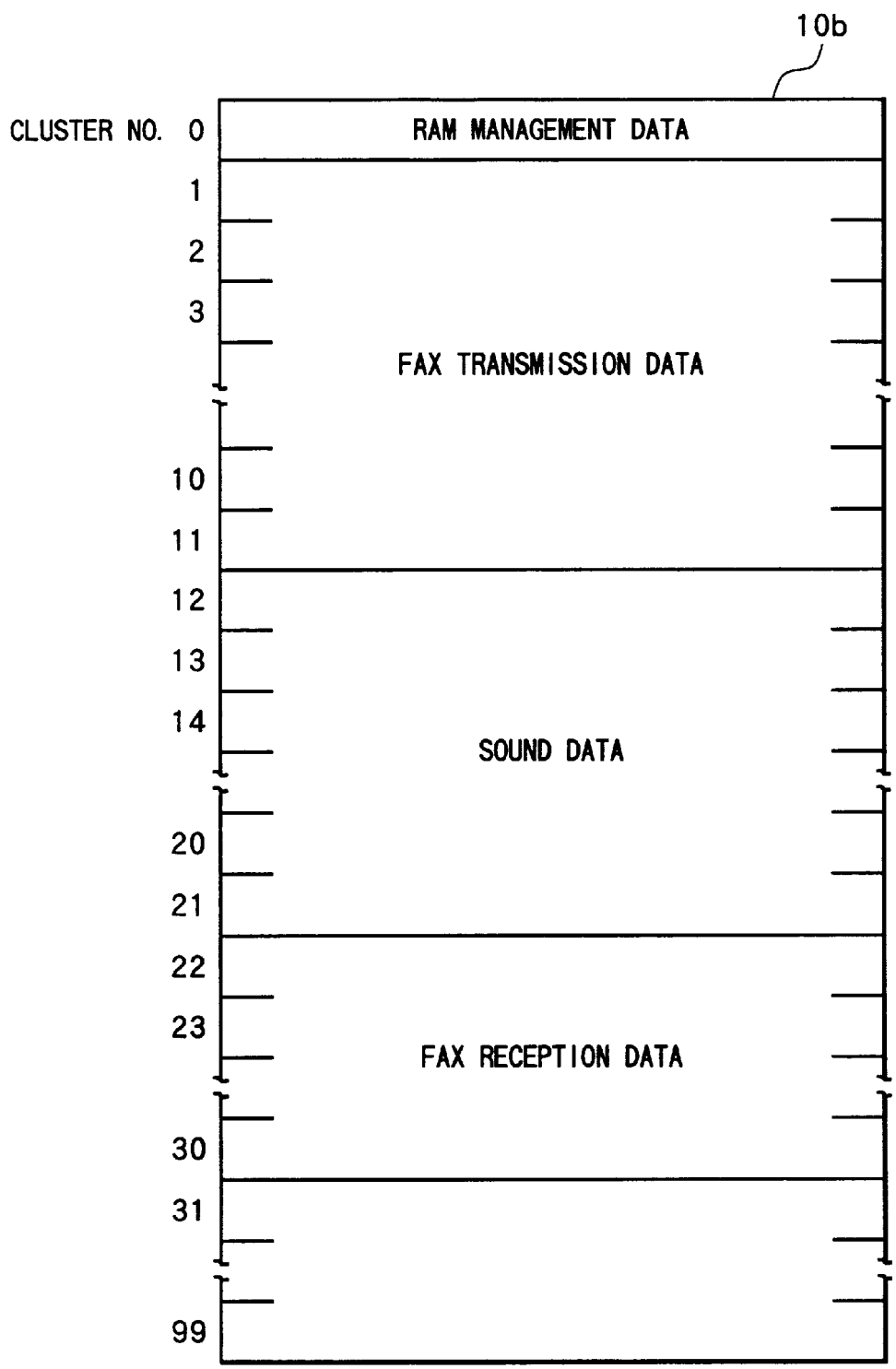
FIG. 17 illustrates how a RAM is sectioned into storage regions according to the fourth embodiment.

As shown in FIG. 17, the RAM 10b is sectioned into storage regions cluster No. 0 through cluster No. 99. Cluster No. 0 is allotted for storage of RAM management data, an example of which is shown in FIG. 18. The remaining clusters 1 through 99 are regions in which can be stored sound data of schedule messages; FAX transmission data of images to be transmitted by the facsimile machine; and FAX reception data of images received by the facsimile machine. In the example shown in FIG. 17, FAX transmission data is stored in clusters No. 1 through 11; sound data of schedule messages is stored in clusters No. 12 through 21; and FAX reception data is stored in clusters No. 22 through 30. As shown in FIG. 18, the storage region of the RAM in the cluster No. 0 stores management data for all the data stored from cluster No. 1. Each management data includes: data type of corresponding data stored in cluster Nos. 1–99 (i.e., schedule data, FAX transmission data, or FAX reception data); cluster numbers where the corresponding data is stored; and attribute information of the corresponding data. (The management data for schedule data, FAX transmission data, and FAX reception data will be referred to as "schedule management data, FAX transmission management data, and FAX reception management data," respectively.) Every time when data is stored in the RAM at either address in cluster Nos. 1 through 99, these data type, these cluster numbers, and these attribute informations are stored in the RAM management data storage region in cluster No. 0. The attribute information for the schedule management data includes a reproduced message flag F to indicate whether a corresponding schedule message has been reproduced.

Figure 13:
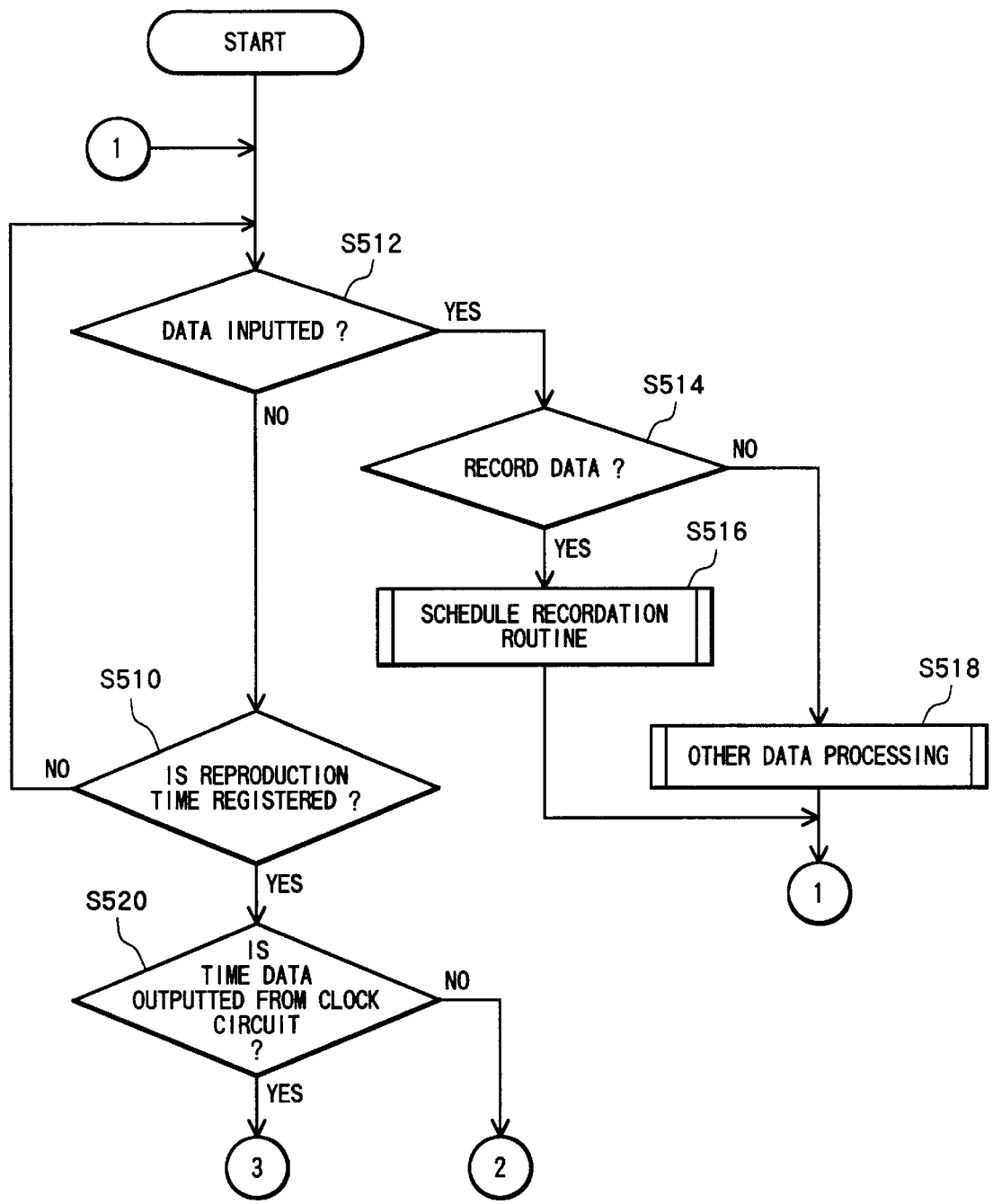
FIG. 13 is a flowchart of a main routine (a main part of a schedule reproduction erasure routine) according to the fourth embodiment.
Figure 14:
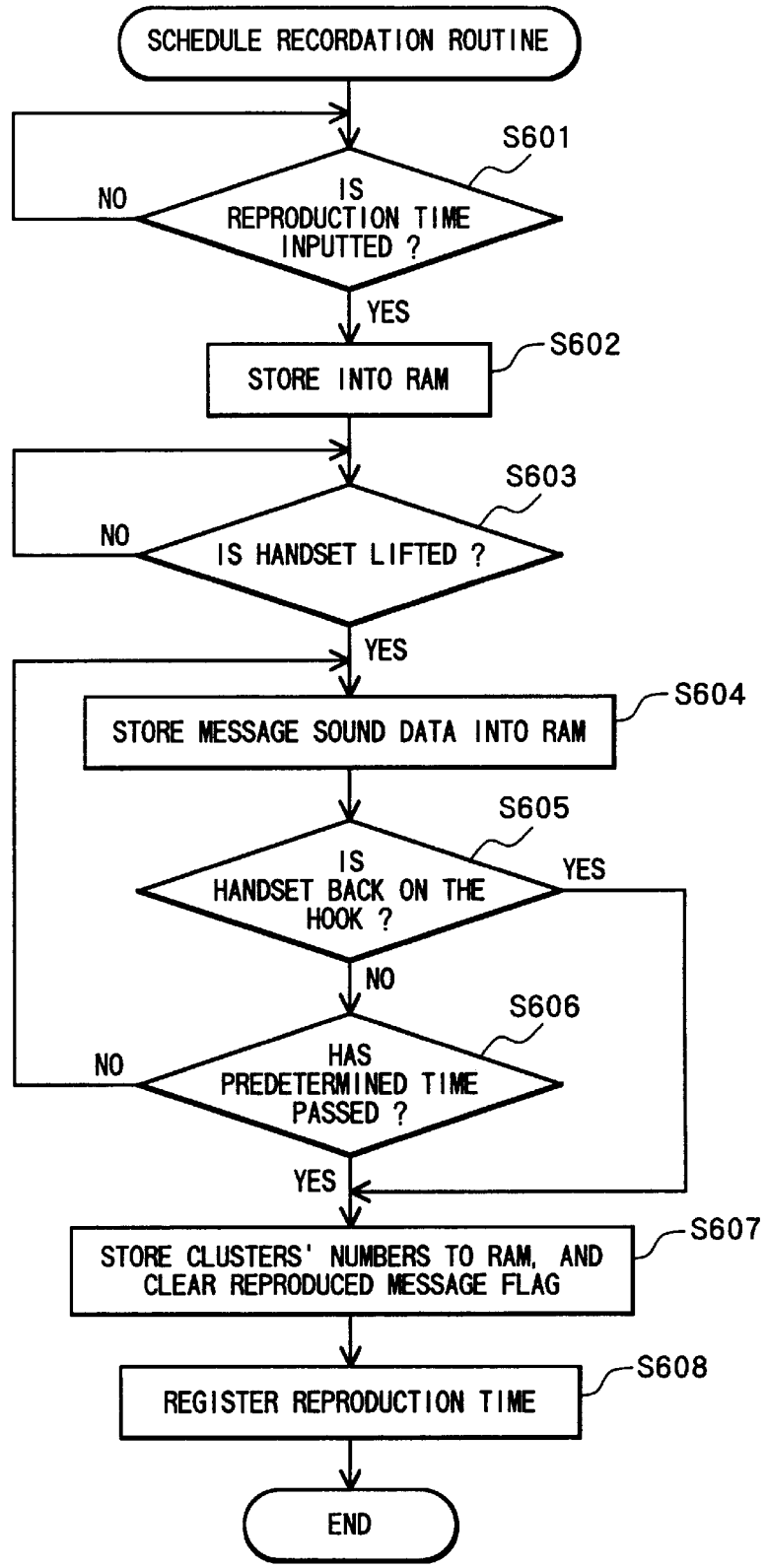
FIG. 14 is a flowchart of a schedule recording routine of the fourth embodiment.
Figure 15:
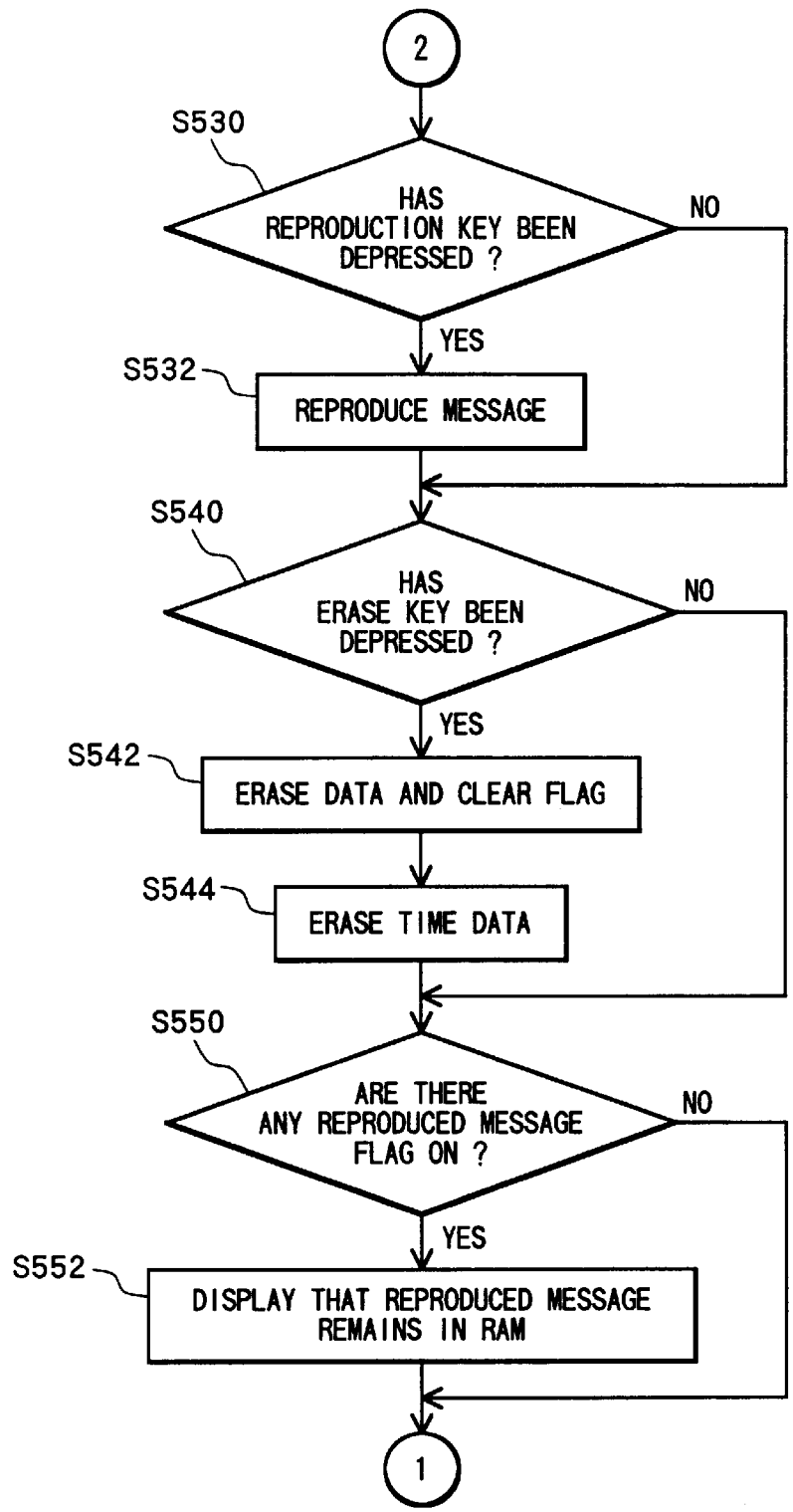
FIG. 15 is another part of the schedule reproduction erasure routine of the fourth embodiment.
Figure 16:
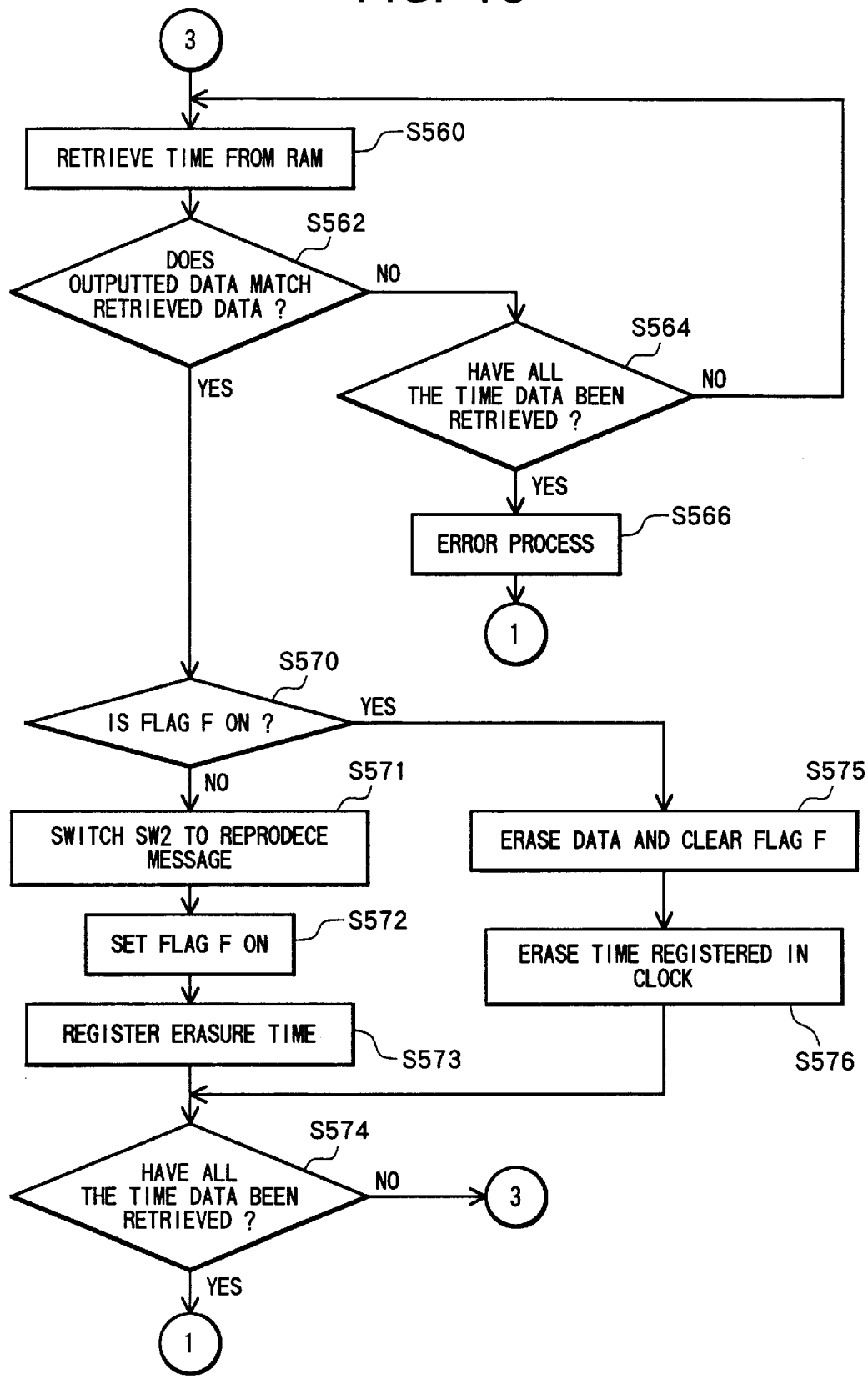
FIG. 16 is a remaining part of the schedule reproduction erasure routine of the fourth embodiment.

In the ROM 10c are stored a main routine (schedule reproduction erasure routine) represented by the flowcharts shown in FIGS. 13, 15 and 16; and a schedule recording routine represented by the flowchart shown in FIG. 14.

The panel 17 further has an erase key for erasing a schedule message stored in the RAM 10b.

When the facsimile machine with the above-described structure is ready to operate, the present time is monitored by the clock circuit 10d. When the facsimile machine is turned ON, the CPU 10a starts performing the main routine shown in FIG. 13 to enter a standby state for waiting input of any data.

When a user of the facsimile machine manipulates a record key provided to the panel 17 to record a schedule message (i.e., S512 and S514 are YES), the CPU 10a executes the schedule recording routine in S516. In the schedule recording routine of FIG. 14, when the user manipulates a key on the panel 17 to designate the time on which the schedule message is desired to be reproduced (i.e., S601 is YES), in S602 the time for reproduction of the schedule message is stored as attribute information of the schedule management data in cluster No. 0 (refer to FIG. 17 and 18) of the RAM 10b. When the user lifts the handset 13 from the hook of the facsimile machine (i.e., S603 is YES), in S604 the user's schedule message he or she speaks into the internal microphone of the handset 13 is stored in the RAM 10b at, for example, clusters 12 through 21. Processes of S604 are continued until the user places the handset 13 back on the hook (i.e., S605 is YES) or until the predetermined amount of recording time (for example three minutes) runs out (i.e., S606 is YES), whichever occurs first. When the user places the handset 13 (i.e., S605 is YES), or the predetermined amount of recording time runs out while the user still has not placed the handset 13 (i.e., S606 is YES), the program proceeds to S607.

In S607, the numbers of the clusters where the schedule message has been stored in S604 are stored in cluster No. 0 at a location where the reproduction time designated to reproduce that schedule message has been stored in S602. Also in S607, the reproduced message flag F for the corresponding portion of the RAM 10b is cleared. Next, the designated reproduction time of the schedule message stored in S602 is recorded in the clock circuit 10d in S608. In other words, the time when the schedule message stored in the RAM 10b during S604 is to be reproduced is registered in the clock circuit 10d in S608. Then the schedule record routine is completed and the program returns to S512.

In order to record a plurality of schedule messages, the above-described schedule recordation routine is performed repeatedly, so that a plurality of schedule messages are recorded, and plural reproduction times designated for reproducing the corresponding schedule messages are registered in the clock circuit 10d.

When data is transmitted to the facsimile machine from a remote facsimile machine (i.e., S512 is YES and S514 is NO), processes other than the schedule recordation routine are performed in S518, where the received data is stored in the RAM 10b with a resolution and an encoding format. The program then returns to S512. Similarly, when data is to be transmitted from the facsimile machine to a remote facsimile machine (i.e., S512 is YES and S514 is NO), processes other than the schedule recordation routine are also performed in S518, where the image data obtained by the image sensor 15 is stored in the RAM 10b with a resolution and an encoding format. The program then returns to S512.

Because a designated reproduction time has been registered in the time circuit 10d during S608 of the schedule recordation routine (S516), while data is not inputted (S512 is NO), a YES determination will be made in S510. Next in S520, whether or not time data has been transmitted from the clock circuit 10d is determined. That is, when the time in the clock circuit 10d matches at least one of a plurality of registered times, the clock circuit 10d outputs time data that indicates the matched time to the CPU 10a. The determination in S520 is therefore made based on whether or not the CPU 10a receives time data from the clock circuit 10d.

If, at this point, the time as monitored by the clock circuit 10d has not yet reached any of the registered times (i.e., S520 is NO), the program proceeds to S530 of FIG. 15, where whether or not a reproduction key of the panel 17 has been depressed, thereby indicating the user's desire to reproduce the schedule message, is determined. If yes (i.e., S530 is YES), the schedule message sound is reproduced. On the other hand, if not (i.e., S530 is NO), whether or not an erase key on the panel 17 has been depressed, thereby indicating the user's desire to erase the schedule message stored in the RAM 10b, is determined in S540. If yes (i.e., S540 is YES), the schedule message is erased. On the other hand, if no indication has been received from the panel to reproduce or erase schedule messages (i.e., both S530 and S540 are NO), whether or not any of the reproduced message flags F stored in correspondence with schedule messages in the cluster No. 0 of the RAM 10b are in an ON condition is determined in S550.

In the example shown in FIG. 18, the reproduced message flag F for the schedule message stored in clusters No. 39 through 54 is ON, which indicates that this schedule message has already been reproduced. Therefore, S550 will be a YES determination, so that the program proceeds to S552. In S552, a message is displayed on a liquid crystal display of the panel 17 indicating that a schedule message that has been reproduced remains stored in the RAM 10b. Then the program returns to S512.

On the other hand, when the time monitored by the clock circuit lad reaches at least one of the registered reproduction times, the clock circuit 10d outputs time data to the CPU 10a. In this case, S520 becomes a YES determination, whereupon in S560 (see FIG. 16) the time (both the reproduction time and the erasure time) stored in cluster No. 0 of the RAM 10b is retrieved one at a time from the smallest address of the memory. Next, whether or not the time outputted by the clock circuit 10d matches the time retrieved from the RAM 10b is determined in S562. Then S560 through S564 are repeated, so that times stored in the RAM 10b are retrieved in order until those retrieved match those outputted from the clock circuit 10d. When a retrieved time matches the outputted time (i.e., S562 is YES), in S570 the reproduced message flag F for the schedule message that corresponds to the retrieved time is checked and whether or not the reproduced message flag F is ON is determined.

Assuming now that the time outputted from the clock circuit 10d is 7:30 of Jan. 19, 1994, the corresponding schedule message is the one stored in the cluster No. 31 through 38 in FIG. 18. Because the reproduced flag F of this schedule message is OFF (i.e., S550 is NO), the schedule message, that is, sound data stored in the RAM 10b, has not yet been reproduced. Therefore, in S571 the switch SW2 switches so that the modem 10e is connected to the speaker 14 and the modem 10e outputs analog sound data for the schedule message to the speaker 14. The speaker 14 reproduces the schedule message as a spoken message. If the user is nearby, he or she can hear the schedule message at the designated reproduction time. At this stage, the sound data for the schedule message and the schedule management data indicating the reproduction time are maintained as is in the RAM 10b.

Next, the reproduced message flag F of the reproduced schedule message is turned ON in S572. Then, the time that follows the reproduction time by a predetermined period of time (for example, 24 hours) is registered in the clock circuit 10d in S573. In this example, 7:30 of Jan. 20, 1994 is registered. This time is when the sound data indicating the schedule message and the schedule management data indicating the reproduction time will be automatically erased from the RAM 10b. In the same manner as in S564, whether or not all the times (including reproduction and erasure times) have been retrieved from the management data storing region of the RAM 10b is determined in S574. If not all have been retrieved (i.e., S574 is NO), the program returns to S560, whereupon the next time data is retrieved and the above-described processes are repeated. When all the times and date have been retrieved (i.e., S574 is YES), the program returns to S512, whereupon the program waits for input or data. That is, the program waits for data to be received from a remote facsimile machine, data to be inputted from the panel 17, data to he inputted from, the CCD sensor 15, and the like. The processes in S512 through S552 are repeatedly executed.

When the NCU 11 receives image data as FAX reception data over the telephone line 12 (i.e., S512 is YES and S514 is NO), the modem 10e receives the FAX reception data via the switch SW2 and stores it in as many unused clusters of the RAM 10b as necessary in S518. When a document is to be transmitted as FAX transmission data (i.e., S512 is YES and S514 is NO), the document image retrieved by the CCD image sensor 15 is stored as FAX transmission data in as many unused clusters of the RAM 10b as necessary in S518. The FAX transmission data is retrieved by the modem 10e and transmitted over the telephone line 12 via the NCU 11 and the switch SW2.

When the time monitored by the clock circuit 10d arrives at 19:00 of Jan. 19, 1994, and therefore matches the time registered in the clock circuit 10d for erasing the schedule message of cluster Nos. 39–54, then the clock circuit 10d outputs time data to the CPU 10a (i.e., S512 is NO, S510 is YES, and S520 is YES). The program proceeds to S560, where times stored in cluster No. 0 of the RAM 10b are retrieved one at a time in order. Then S560 through S564 are repeated and times stored in the RAM 10b are retrieved in order until those retrieved match those outputted from the clock circuit 10d. When a retrieved time matches the outputted time (i.e., S562 is YES), the program proceeds to S570.

At this time, the schedule message that corresponds to the retrieved time is stored in clusters No. 39 through 54 in FIG. 18. This schedule message has already been reproduced so its reproduced message flag F is ON (i.e., S570 is YES). Therefore the schedule management data, such as the erasure time, the reproduction time, the numbers of clusters used, and the sound data indicating the schedule message stored in the RAM 10b, are erased in S575. Next, the time registered in the clock circuit 10d is erased in S576 and the program proceeds to S574, whereupon the same processes described above are repeated.

The facsimile machine of the present embodiment can be designed so that the duration of the predetermined time can be manually changed in S573. This allows users to select how long he or she wants schedule messages to be maintained in (that is, not erased from) the RAM 10b after the schedule messages have been reproduced. Because data stored in the RAM 10b is automatically erased at a time that, in essence, is determined by the user, data will remain in the RAM 10b for a duration or time that is optimally appropriate for the user.

In the above description, the time registered in the clock circuit 10d is erased in S576. However, output of the time data from the clock circuit 10d could tender the time registered in the clock circuit 10d into a condition where it can be written over when a new time is registered.

As described above, according to the fourth embodiment, a schedule message and the time for its reproduction are stored in the RAM 10b as sound data and schedule management data. Also, the reproduction time is registered in the clock circuit 10d. Afterward, when the present time as monitored in the clock circuit 10d matches the reproduction time, the schedule message is automatically reproduced by the speaker 14. If the user is nearby, he or she can listen to the schedule message when it is reproduced. Also, an automatic erasure time, when the data indicating the schedule message and the reproduction time is to be erased, is registered in the clock circuit 10d while a schedule message is being automatically reproduced. The automatic erasure time is determined based on a predetermined duration of time after the automatic reproduction time. When the present time as monitored by the clock circuit 10d reaches the automatic erasure time, the data indicating the schedule message and the reproduction time is automatically erased. Therefore, there is no problem of a user forgetting to manually erase unnecessary data. Because data indicating unnecessary schedule messages and reproduction times are erased at appropriate times, the memory of the RAM 10b will not be wasted.

Sound data indicating a schedule message is maintained in the RAM 10b from when the schedule message is reproduced until the automatic erasure time. Because this is displayed on the panel 17 in S552, a user can confirm the schedule message by manipulating the reproduction key on the panel 17 to cause the speaker 14 to reproduce the schedule message. Therefore a user will be able to hear and confirm the content of previously reproduced messages. In this case, by setting an appropriate predetermined duration of time, the data will never be erased before the user hears the schedule message.

The memory in which the schedule message and the reproduction time are stored as sound data and schedule management data respectively, that is, the RAM 10b, is for storing FAX transmission data and FAX reception data. Since both are stored in the same memory, and other memory is unnecessary, costs are reduced.

That data for reproduced messages remains in the memory need not be continuously displayed by the liquid crystal display unit of the panel 17 as described in S552 of the fourth embodiment, but could instead be displayed intermittently.

In the fourth embodiment, the determination of S520 is made based on whether or not the present time as monitored by the clock circuit 10d matches the time registered in the clock circuit 10d. However, the program need not include S608 where the reproduction time is registered, S573 where the erasure time is registered, or S576 where the times registered in the clock circuit 10d are erased. Instead, reproduction times and/or automatic erasure times can be stored arranged in the RAM 10b in the order reproduction or erasure is to be performed (as opposed to the order in which the times were registered). The present time of the clock circuit 10d could be compared with the earliest of the times stored in the RAM 10b. The determination in S520 could then be performed based on a single judgement whether or not the present time of the clock circuit 10d matches the earliest reproduction time or erasure time in the RAM 10b.

In the fourth embodiment, the automatic erasure time is described as being set after the message is reproduced. However, the automatic erasure time can be set as soon as the present time monitored by the clock circuit 10d reaches the message reproduction time.

In the fourth embodiment, a message is described as erased from the memory at the automatic erasure time. However, the program can be modified so that reproduced messages are erased from the memory when the memory becomes too full.

The facsimile machine can be designed so that the predetermined duration of time when a message is automatically erased after being reproduced can be changed. The facsimile machine can be designed so that messages are reproduced once more at the automatic erasure time. Additionally, erasure of messages can be delayed further until the memory is full.

According to the facsimile machine of the fourth embodiment, when the time of the clock reaches the designated reproduction time, the message stored in the memory means is automatically reproduced. Afterward, when the time of the clock reaches the automatic erasure time, which is set based on the designated reproduction time, the message is automatically erased from the memory. As a result, even if a user is not near the facsimile machine when the message is reproduced, the user has an opportunity to listen to a message stored in the memory from when the time of the clock reaches the designated reproduction time or from when the message is reproduced until the automatic erasure time. When the time of the clock reaches the automatic erasure time, the message and the designated reproduction time are automatically, not manually, erased from the memory. Therefore memory space of the memory will not be wasted and can be effectively used.

A statement, which reads that a reproduced message is being maintained as sound data in the memory, is displayed from when the time of the clock reaches the designated reproduction time until the automatic erasure time, that is, between when the message is reproduced to when it is erased. Therefore, even after the message is reproduced, the user can visually confirm that a message exists and again reproduce the message.

While the invention has been described in detail with reference to specific embodiments thereof, it would be apparent to those skilled in the art that various changes and modifications may be made therein without departing from the spirit of the invention, the scope of which is defined by the attached claims.

For example, the first embodiment is directed to a telephone (answering machine) and the second through fourth embodiments are directed to a facsimile machine. However, the present invention can be applied to any information transmission/reception device, such as a telephone, a facsimile machine, a computer or the like. The information transmission/reception device need not record messages inputted directly to the information transmission/reception device, but can instead record messages transmitted from a remote information transmission/reception device. Further, the second through fourth embodiments are directed to recording of schedule messages. However, the present invention is applicable to recording of any type of messages.

What is claim is:

1. A facsimile machine for transmitting information to and receiving information from a remote facsimile machine, comprising:

data input means for inputting various data including sound data;

transmission/reception control means for transmitting at least one of image data and sound data as transmission data to a remote facsimile machine and for receiving at least one of sound data and image data from the remote facsimile machine;

sound data recording means for recording at least one of sound data inputted by the sound data input means and sound data received by the transmission/reception control means;

sound reproduction means for reproducing the sound data recorded by the sound data recording means;

visualizing means for visualizing various data;

clock means for monitoring time;

memory means for storing time information on time at which the sound data is desired to be reproduced, the time information being transmitted from the remote facsimile machine when the sound data is transmitted from the remote facsimile machine and being inputted by the data input means when the sound data is inputted by the data input means; and control means for controlling the sound reproduction means to reproduce the sound data when the time measured by the clock means reaches the time at which the sound data is desired to be reproduced, and for controlling said visualizing means, after the sound data is reproduced, to visualize an information that the sound data is reproduced and is retained in said recording means.

2. A facsimile machine of claim 1, wherein the visualizing means includes printing means for printing data onto printing medium, the control means controlling the printing means, after the sound data is reproduced, to indicate a statement that the sound data is reproduced and is retained in said recording means.

3. A facsimile machine of claim 1, wherein the visualizing means includes display means for displaying data, the control means controlling the display means, after the sound data is reproduced, to indicate a statement that the sound data is reproduced and is retained in said recording means.

4. A facsimile machine of claim 1, further comprising:
erasure time setting means for, when the sound data is reproduced, setting an automatic erasure time when the reproduced sound data is desired to be erased; and
erasure control means for, when the time measured by the clock means reaches the automatic erasure time, automatically erasing the sound data.

5. A facsimile machine of claim 4, wherein the erasure time setting means sets the automatic erasure time, when the time measured by the clock means reaches the time at which the sound data is desired to be reproduced.

6. A facsimile machine of claim 4, wherein the erasure time setting means sets the automatic erasure time, when the control means controls the reproduction means to reproduce the sound data.

* * * * *